US012639025B2

(12) United States Patent
Hallberg et al.

(10) Patent No.: US 12,639,025 B2
(45) Date of Patent: May 26, 2026

(54) SHARED 3RD PERSON MOBILE VIEW

(71) Applicant: Snap Inc., Santa Monica, CA (US)

(72) Inventors: Matthew Hallberg, Los Angeles, CA (US); Karen Stolzenberg, Venice, CA (US); Mathieu Emmanuel Vignau, Los Angeles, CA (US); Kristian Bauer, West Boylston, MA (US); Kevin Liao, Sammamish, CA (US); Matthew Du, Los Angeles, CA (US); Ilteris Kaan Canberk, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/824,170

(22) Filed: Sep. 4, 2024

(65) Prior Publication Data

US 2026/0064351 A1    Mar. 5, 2026

(51) Int. Cl.
| | |
|---|---|
| *G06F 3/14* | (2006.01) |
| *G06T 7/33* | (2017.01) |
| *G06T 7/73* | (2017.01) |

(52) U.S. Cl.
CPC .............. *G06F 3/1454* (2013.01); *G06T 7/33* (2017.01); *G06T 7/73* (2017.01); *G06T 2207/10028* (2013.01); *G06T 2207/30204* (2013.01)

(58) Field of Classification Search
CPC ............. G06T 19/006; G06T 2219/024; G06T 2207/30244; G06T 7/73; G06T 15/20; G06T 2207/10028; G06T 2207/30204; G06F 3/012; G06F 3/011; G06F 1/163; H04L 67/131; H04L 67/52
See application file for complete search history.

(56) References Cited

U.S. PATENT DOCUMENTS

| | | | | |
|---|---|---|---|---|
| 10,547,974 B1 * | 1/2020 | Pollefeys | .............. | G01S 19/485 |
| 10,748,302 B1 * | 8/2020 | Dine | ........................ | G06T 19/00 |
| 10,803,666 B1 * | 10/2020 | Buerli | .................... | G06T 19/006 |
| 2013/0194304 A1 * | 8/2013 | Latta | ...................... | G09G 3/003 |
| | | | | 345/633 |
| 2019/0197788 A1 | 6/2019 | Forbes et al. | | |
| 2023/0176805 A1 * | 6/2023 | Dudovitch | ............ | A63F 13/847 |
| | | | | 715/757 |
| 2023/0401796 A1 | 12/2023 | Evangelidis et al. | | |
| 2024/0404213 A1 * | 12/2024 | Mcilree | .................. | G06F 3/011 |

FOREIGN PATENT DOCUMENTS

| | | |
|---|---|---|
| WO | 2024145124 | 7/2024 |

OTHER PUBLICATIONS

"International Application Serial No. PCT US2025 041108, Written Opinion mailed Nov. 20, 2025", 5 pgs.
"International Application Serial No. PCT US2025 041108, International Search Report mailed Nov. 20, 2025", 4 pgs.

* cited by examiner

*Primary Examiner* — Sujit Shah
(74) *Attorney, Agent, or Firm* — SCHWEGMAN LUNDBERG & WOESSNER, P.A.

(57) ABSTRACT

A method for sharing a display of a mixed reality experience is described. In one aspect, the method includes pairing a head-wearable device with a handheld device to establish a shared coordinate system, and displaying, based on a pose of the handheld device, a virtual object of a first mixed reality application operating at the head-wearable device, with a second mixed reality application operating at the handheld device using the shared coordinate system.

20 Claims, 18 Drawing Sheets

REAL WORLD ENVIRONMENT

112

324

HEAD-WEARABLE DEVICE

314   OPTICAL SENSOR 312   6DOF TRACKER

332   DEPTH SENSOR

DEPTH SYSTEM

POINT CLOUD
DATA A 608

SHARED DEVICE APPLICATION    328

114

800

114 — HANDHELD DEVICE

112

POINT CLOUD DATA B 708

DEPTH SYSTEM 324

HEAD-WEARABLE DEVICE

328

POINT CLOUD DATA A 608

SHARED DEVICE APPLICATION

HANDHELD DEVICE INTERFACE — 802

POINT CLOUD ALIGNMENT APPLICATION — 804

RELATIVE POSE MODULE — 806

COORDINATE FRAME ALIGNMENT MODULE — 808

1106 ALIGN COORDINATE SYSTEM OF HANDHELD DEVICE WITH COORDINATE SYSTEM OF HEAD-WEARABLE DEVICE

1108 DISPLAY AR EXPERIENCE OF THE HEAD-WEARABLE DEVICE ON THE DISPLAY OF THE HANDHELD DEVICE FROM THE PERSPECTIVE OF THE HANDHELD DEVICE USING THE SHARED COORDINATE SYSTEM

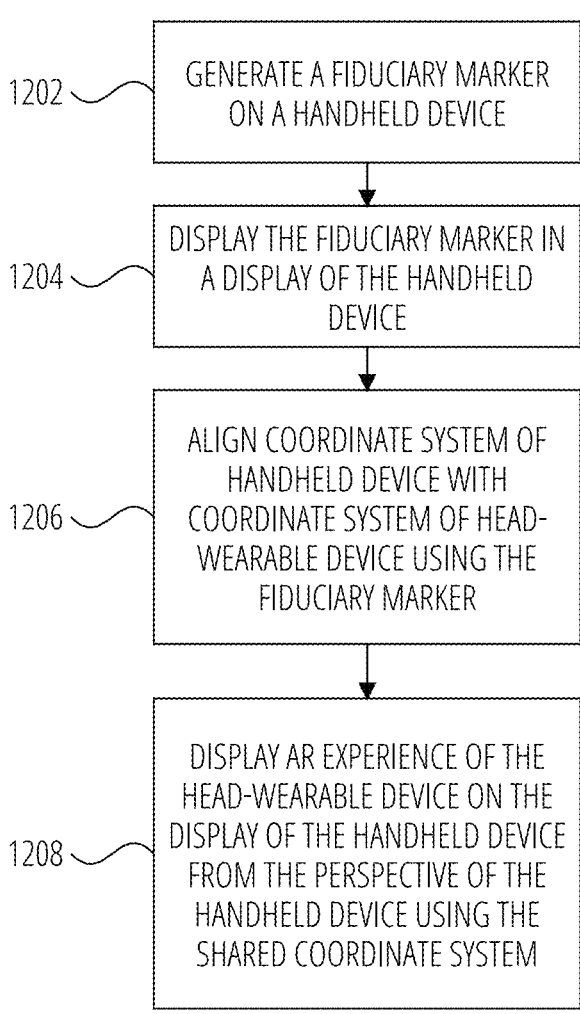

1202 — GENERATE A FIDUCIARY MARKER ON A HANDHELD DEVICE

1204 — DISPLAY THE FIDUCIARY MARKER IN A DISPLAY OF THE HANDHELD DEVICE

1206 — ALIGN COORDINATE SYSTEM OF HANDHELD DEVICE WITH COORDINATE SYSTEM OF HEAD-WEARABLE DEVICE USING THE FIDUCIARY MARKER

1208 — DISPLAY AR EXPERIENCE OF THE HEAD-WEARABLE DEVICE ON THE DISPLAY OF THE HANDHELD DEVICE FROM THE PERSPECTIVE OF THE HANDHELD DEVICE USING THE SHARED COORDINATE SYSTEM

FIG. 12

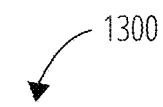

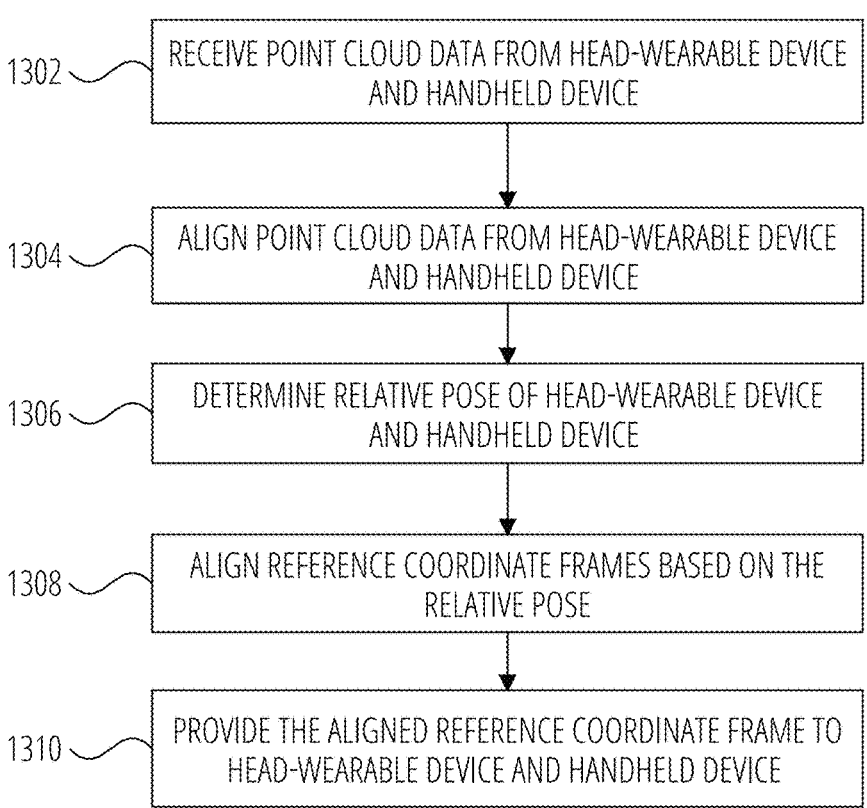

1302 — RECEIVE POINT CLOUD DATA FROM HEAD-WEARABLE DEVICE AND HANDHELD DEVICE

1304 — ALIGN POINT CLOUD DATA FROM HEAD-WEARABLE DEVICE AND HANDHELD DEVICE

1306 — DETERMINE RELATIVE POSE OF HEAD-WEARABLE DEVICE AND HANDHELD DEVICE

1308 — ALIGN REFERENCE COORDINATE FRAMES BASED ON THE RELATIVE POSE

1310 — PROVIDE THE ALIGNED REFERENCE COORDINATE FRAME TO HEAD-WEARABLE DEVICE AND HANDHELD DEVICE

1402 — RECEIVE VIRTUAL OBJECT DATA IN REFERENCE FRAME A

1404 — ACCESS COORDINATE FRAME ALIGNMENT BETWEEN HEAD-WEARABLE DEVICE AND HANDHELD DEVICE

1406 — DISPLAY VIRTUAL OBJECT IN REFERENCE FRAME B

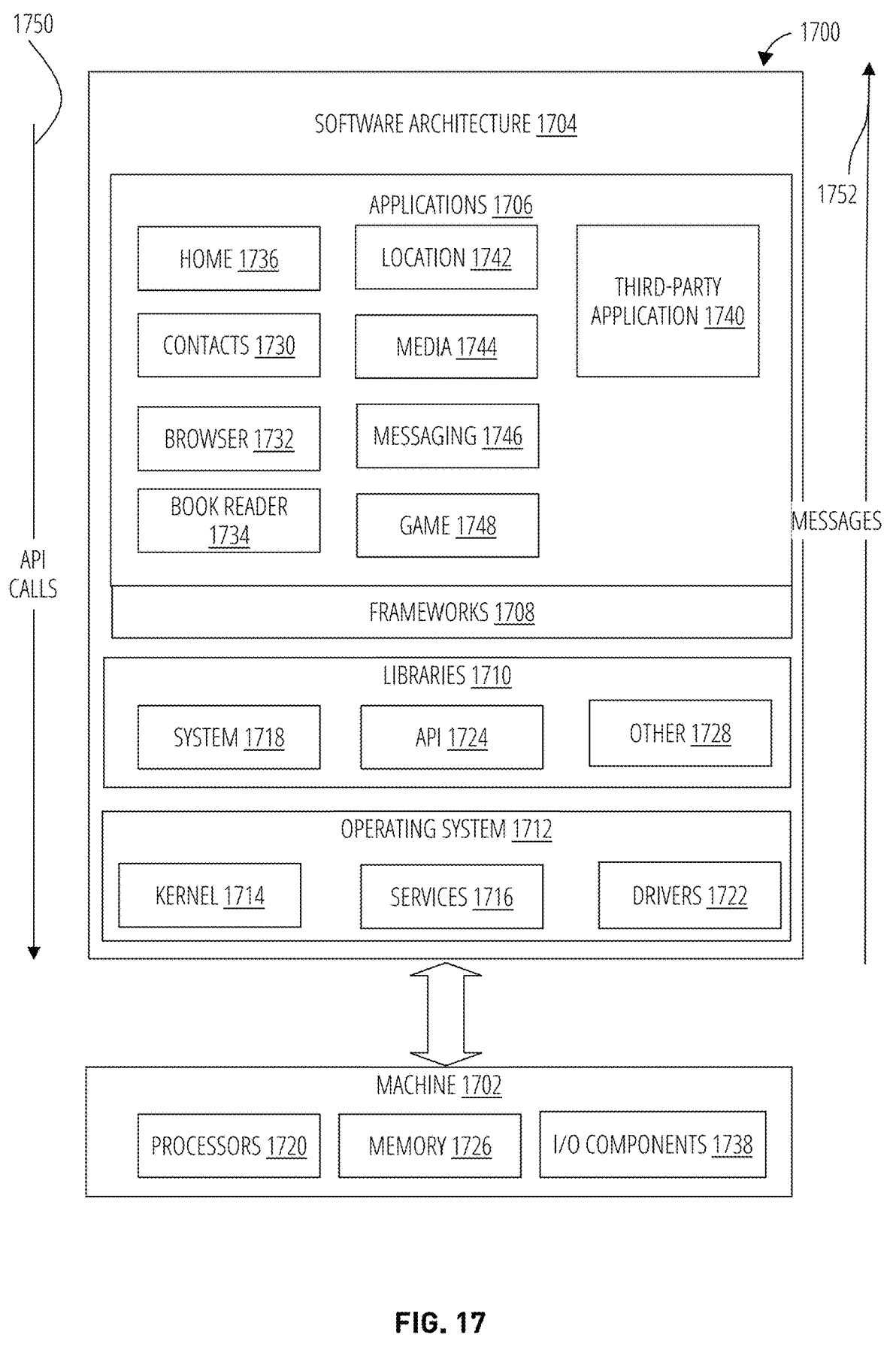

1750

1700

1752

SOFTWARE ARCHITECTURE 1704

APPLICATIONS 1706

| HOME 1736 | LOCATION 1742 | THIRD-PARTY APPLICATION 1740 |

| CONTACTS 1730 | MEDIA 1744 | |

| BROWSER 1732 | MESSAGING 1746 |

| BOOK READER 1734 | GAME 1748 |

API CALLS

MESSAGES

FRAMEWORKS 1708

LIBRARIES 1710

| SYSTEM 1718 | API 1724 | OTHER 1728 |

OPERATING SYSTEM 1712

| KERNEL 1714 | SERVICES 1716 | DRIVERS 1722 |

MACHINE 1702

| PROCESSORS 1720 | MEMORY 1726 | I/O COMPONENTS 1738 |

FIG. 17

SHARED 3RD PERSON MOBILE VIEW

TECHNICAL FIELD

The subject matter disclosed herein generally relates to the field of augmented reality (AR) systems, particularly to methods and systems for sharing AR experiences between AR eyewear and mobile devices.

BACKGROUND

Augmented reality (AR) technology has rapidly evolved in recent years, with AR eyewear becoming increasingly sophisticated and capable of delivering immersive experiences. However, sharing these experiences with others who do not have access to AR eyewear has remained a challenge, often requiring complex setup procedures or limiting the viewer to a first-person perspective.

Existing solutions for sharing AR experiences typically involve streaming a direct video feed from the AR device, which limits the viewer's ability to independently explore the augmented environment. Additionally, the development of multiplayer or shared AR experiences has traditionally required significant effort from content creators, limiting the availability of easily shareable AR content.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 12 illustrates a method for aligning coordinate systems using a fiduciary market in accordance with one example embodiment.

FIG. 13 is a flow diagram illustrating a method for aligning reference coordinate frames in accordance with one example embodiment.

FIG. 17 is block diagram showing a software architecture within which the present disclosure may be implemented, according to an example embodiment.

DETAILED DESCRIPTION

Figure 1:
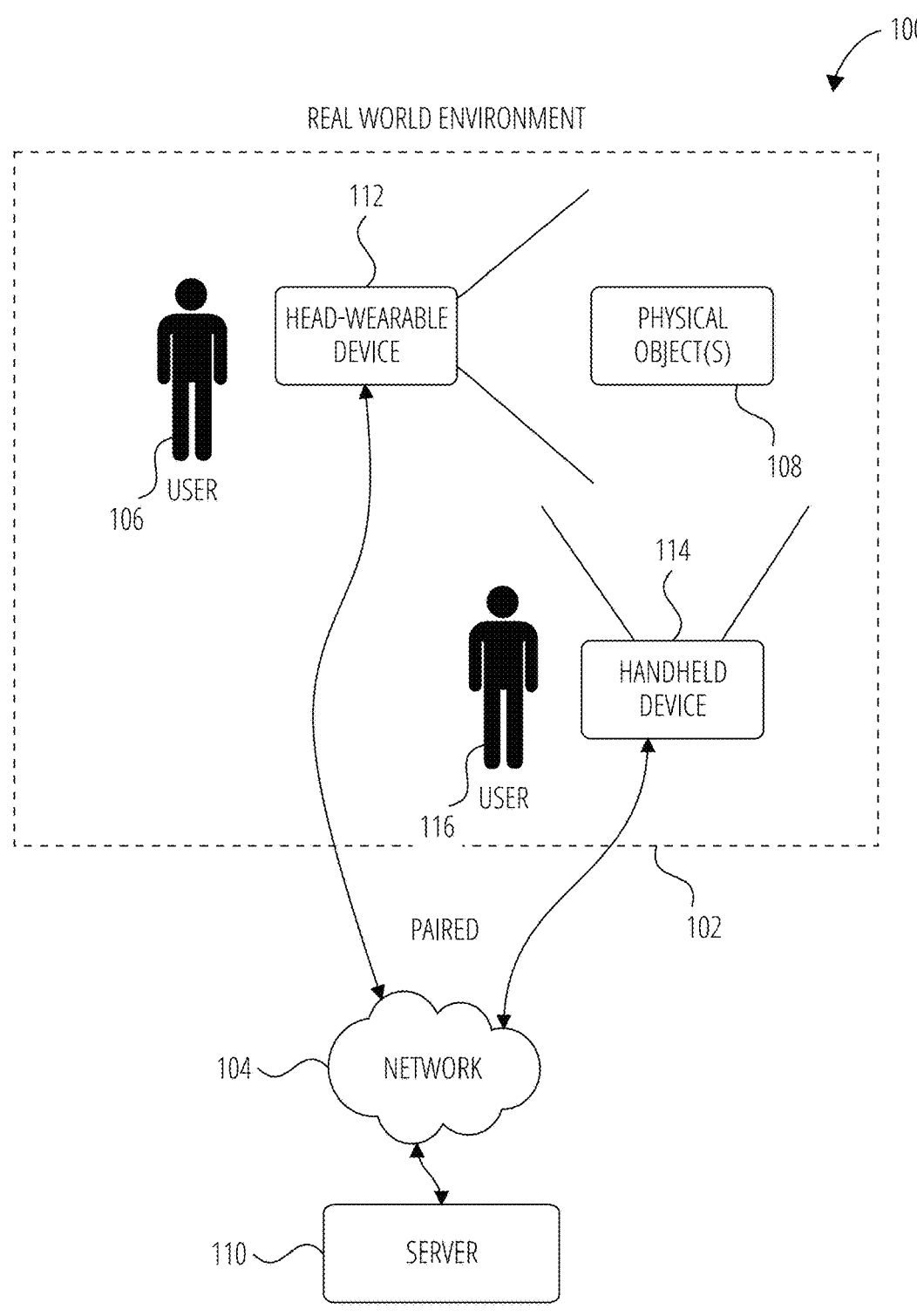
FIG. 1 is a block diagram illustrating a network environment for a shared augmented reality experience in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

Mixed reality (MR) or extended reality (XR) refers to a spectrum of immersive technologies that blend the physical and digital worlds, creating environments where real and virtual elements coexist and interact in real-time. These technologies encompass augmented reality (AR), virtual reality (VR), and hybrid systems that combine aspects of both. In mixed-reality environments, users can interact with digital objects that are seamlessly integrated into their physical surroundings or experience fully immersive virtual worlds that respond to their movements and actions. This technology enables more natural and intuitive interactions with digital content, making it particularly valuable for applications in fields such as education, healthcare, engineering, and entertainment. Mixed reality systems often utilize advanced hand-tracking technologies, like the shadow-based method described in the invention, to allow users to manipulate virtual objects with their hands, enhancing the sense of immersion and enabling more precise control in digital environments.

The term "augmented reality" (AR) is used herein to refer to an interactive experience of a real-world environment where physical objects that reside in the real world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include a visual Simultaneous Localization and Mapping system (VSLAM) and a Visual Inertial Odometry (VIO) system. VSLAM can be used to build a target from an environment, or a scene based on one or more cameras of the visual tracking system. A VIO system (also referred to as a visual-inertial tracking system) determines the latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of the movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers can also be processed to obtain the velocity and displacement of the IMU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, the 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally or vertically, and up or down. The 6DOF tracking system may include a Simultaneous Localization and Mapping (SLAM) system and/or a VIO system that relies on data acquired from multiple sensors (e.g., depth cameras and inertial sensors). The 6DOF tracking system analyzes data from the sensors to accurately determine the pose of the display device.

The present application describes using a mobile controller tracking technology as a reference point for shared coordinates between a smartphone and a head-wearable device (e.g., smart glasses such as Spectacles of Snap Inc.). This means that there is no need to scan paper markers or go through lengthy mapping user flows to establish shared coordinates between devices. As a result, lens content (or virtula content) can be oriented in the same position for both the Spectacles Device and the Mobile Device. This allows both devices to render and synchronize the same lens in the same position, providing viewers of both devices with the same experience at the same time.

Additionally, because the mobile user can move around freely and see the same lens from their own independent, 3rd person perspective, they can gain a more comprehensive understanding of the Spectacles experience rather than just streaming the same first person view as the Spectacles headset. This helps them to better learn about the expected interactions and the feeling of the experience.

Moreover, the technology leverages natural social dynamics and the user's personal phone to share experiences with another person. This bypasses typical multiplayer flows that require inviting and accepting invites, longer setup times, and additional permissions.

Finally, this experience is built as a platform utility, allowing any lens to be shared through this utility without requiring the lens developer to add special multiplayer features to their lens.

The present application describes a system and method for sharing AR experiences from an AR eyewear (e.g., head-wearable device) to a mobile device (e.g., handheld device), enabling seamless and low-friction sharing with nearby individuals who do not have AR eyewear. In one example, a shared coordinate system is established between the AR eyewear and the mobile device using, for example, a fiducial marker displayed on the mobile device screen, allowing for quick calibration. In another example, the shared coordinate system is established using environment mapping (e.g., 3D points). This shared coordinate system enables real-time viewing of AR content from the eyewear to the mobile device, where the AR content can be viewed from a third-person perspective, allowing the mobile user to move independently and explore the AR content from their own viewpoint.

Other example embodiments include a one-button initiation process on the mobile device for simplified sharing, a platform utility that allows any AR experience to be shared without requiring developers to implement special multiplayer features, and synchronized positional tracking between the AR eyewear and mobile device to maintain accurate positioning of AR content in physical space.

In one example embodiment, a method for sharing a display of a mixed reality experience from one device with another device is described. In one aspect, the method includes pairing a head-wearable device with a handheld device to establish a shared coordinate system and displaying, based on the pose of the handheld device, a virtual object of a first mixed reality application operating at the head-wearable device, with a second mixed reality application operating at the handheld device using the shared coordinate system.

As a result, one or more of the methodologies described herein facilitate solving the technical problem of resource management by aligning coordinate systems from separate augmented reality (AR) devices. The presently described method provides an improvement to the operation of the functioning of a computer by providing power consumption reduction. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating a network environment 100 suitable for operating a head-wearable device 112, a handheld device 114, and a server 110, according to some example embodiments. The network environment 100 includes the head-wearable device 112, the handheld device 114, and the server 110, communicatively coupled to each other via a network 104. The head-wearable device 112, handheld device 114, and the server 110 may each be implemented in a computer system, in whole or in part, as described below with respect to FIG. 18. The server 110 may be part of a network-based system. For example, the network-based system may be or include a cloud-based server system that provides additional information, such as reference frame alignment data of the head-wearable device 112 and the handheld device 114.

A user 106 operates the head-wearable device 112 (e.g., eyewear device such as smart glasses). The user 106 may be a human user (e.g., a human being), a machine user (e.g., a computer configured by a software program to interact with the head-wearable device 112), or any suitable combination thereof (e.g., a human assisted by a machine or a machine supervised by a human). The user 106 operates the head-wearable device 112 by aiming the head-wearable device 112 towards physical object(s) 108 in the real world environment 102.

A user 116 operates the handheld device 114 (e.g., a smartphone, a tablet computer). The user 116 operates the handheld device 114 by aiming a camera of the handheld device 114 towards physical object(s) 108 in the real world environment 102.

The head-wearable device 112 may be a computing device with a display. In one example, the display may be a screen that displays what is captured with a camera of the head-wearable device 112. In another example, the display of the device may be optically or transmissive transparent, such as in lenses of wearable computing glasses, that allow a user to view content presented on the display while simultaneously viewing real-world objects visible through the display.

A first AR application (not shown) operates at the head-wearable device 112. The first AR application provides the user 106 with an AR experience triggered by a physical object(s) 108, such as a two-dimensional physical object (e.g., a picture), a three-dimensional physical object (e.g., a statue), a location (e.g., a room), or any feature point references (e.g., perceived corners of walls or furniture) in the real world environment 102. For example, the user 106 aims a camera of the head-wearable device 112 to capture an image of the physical object(s) 108.

An AR viewing application or a second AR application (not shown) operates at the handheld device 114. The second AR application provides the user 116 with the same AR experience of the first AR application but from the perspective of the handheld device 114. This is accomplished through the process of pairing. For example, the head-wearable device 112 is paired with the handheld device 114 by logging into a same user account.

Once the handheld device 114 and head-wearable device 112 are paired, the handheld device 114 can be used to capture an image of the physical object(s) 108 from a different viewpoint (relative to head-wearable device 112) and display the AR experience of the head-wearable device 112 but from the viewpoint of the handheld device 114.

The head-wearable device 112 includes a tracking system (not shown). The tracking system tracks the pose (e.g., position and orientation) of the head-wearable device 112 relative to the real world environment 102 using optical sensors (e.g., image camera), inertia sensors (e.g., gyroscope, accelerometer), wireless sensors (Bluetooth, Wi-Fi), GPS sensor, and audio sensor to determine the location of the head-wearable device 112 within the real world environment 102.

The handheld device 114 also includes a tracking system (not shown). The tracking system tracks the pose (e.g., position and orientation) of the handheld device 114 relative to the real world environment 102 using optical sensors (e.g., image camera), inertia sensors (e.g., gyroscope, accelerometer), wireless sensors (Bluetooth, Wi-Fi), GPS sensor, and audio sensor to determine the location of the handheld device 114 within the real world environment 102.

In one example embodiment, the server 110 receives the point clouds from head-wearable device 112 and handheld device 114 and aligns the point clouds between the head-wearable device 112 and the handheld device 114 to obtain the relative pose between the head-wearable device 112 and handheld device 114. The server 110 provides the alignment data (e.g., relative pose data) to the head-wearable device 112 and the handheld device 114. In another example, the alignment of the dense point clouds may be performed on either head-wearable device 112, handheld device 114, or the server 110, or a combination between the head-wearable device 112, handheld device 114, and the server 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 110), databases, and devices (e.g., head-wearable device 112, handheld device 114). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
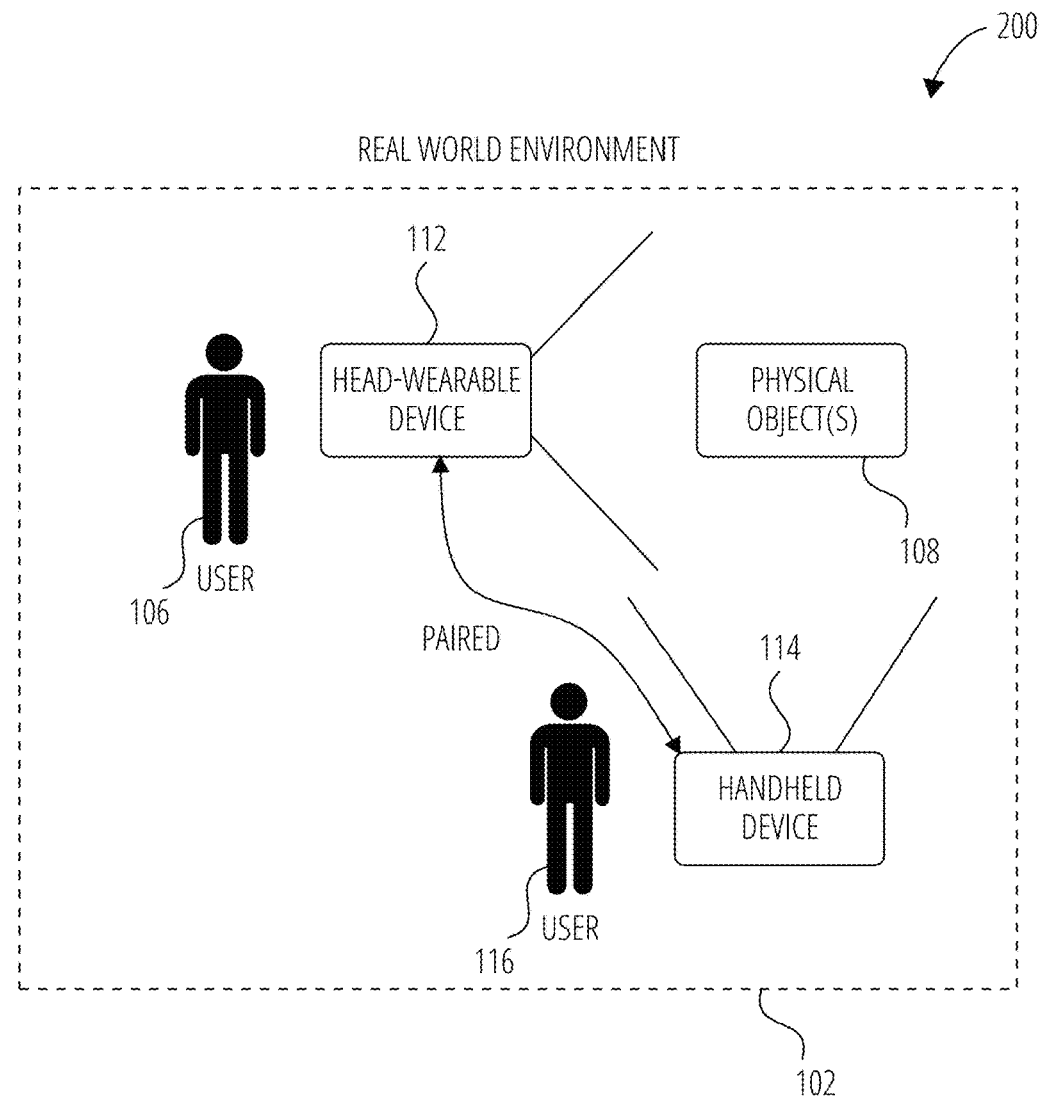
FIG. 2 is a block diagram illustrating a network environment for a shared augmented reality experience in accordance with another example embodiment.

FIG. 2 is a block diagram illustrating a network environment 200 for sharing an AR experience of the head-wearable device 112 with the handheld device 114 in accordance with another example embodiment. The network environment 200 includes the head-wearable device 112 and the handheld device 114. In the example of FIG. 2, the head-wearable device 112 pairs with the handheld device 114 without communicating with the server 110. For example, the head-wearable device 112 pairs using local wireless communication means (e.g., Bluetooth).

The head-wearable device 112 and the handheld device 114 are paired by capturing an image of a fiduciary marker displayed on the handheld device 114 with a camera of the head-wearable device 112. The pairing process includes aligning the coordinate frame of the head-wearable device 112 with the coordinate frame of the handheld device 114 to generate a common or shared coordinate frame. The hand-held device 114 displays the AR experience of the head-wearable device 112 from the perspective or viewpoint of the handheld device 114 using the shared coordinate frame. In one example, the handheld device 114 uses the pose of the handheld device 114 relative to the shared common coordinate frame to display a virtual object anchored to the physical object(s) 108 or the real world environment 102 from a third-person view.

Figure 3:
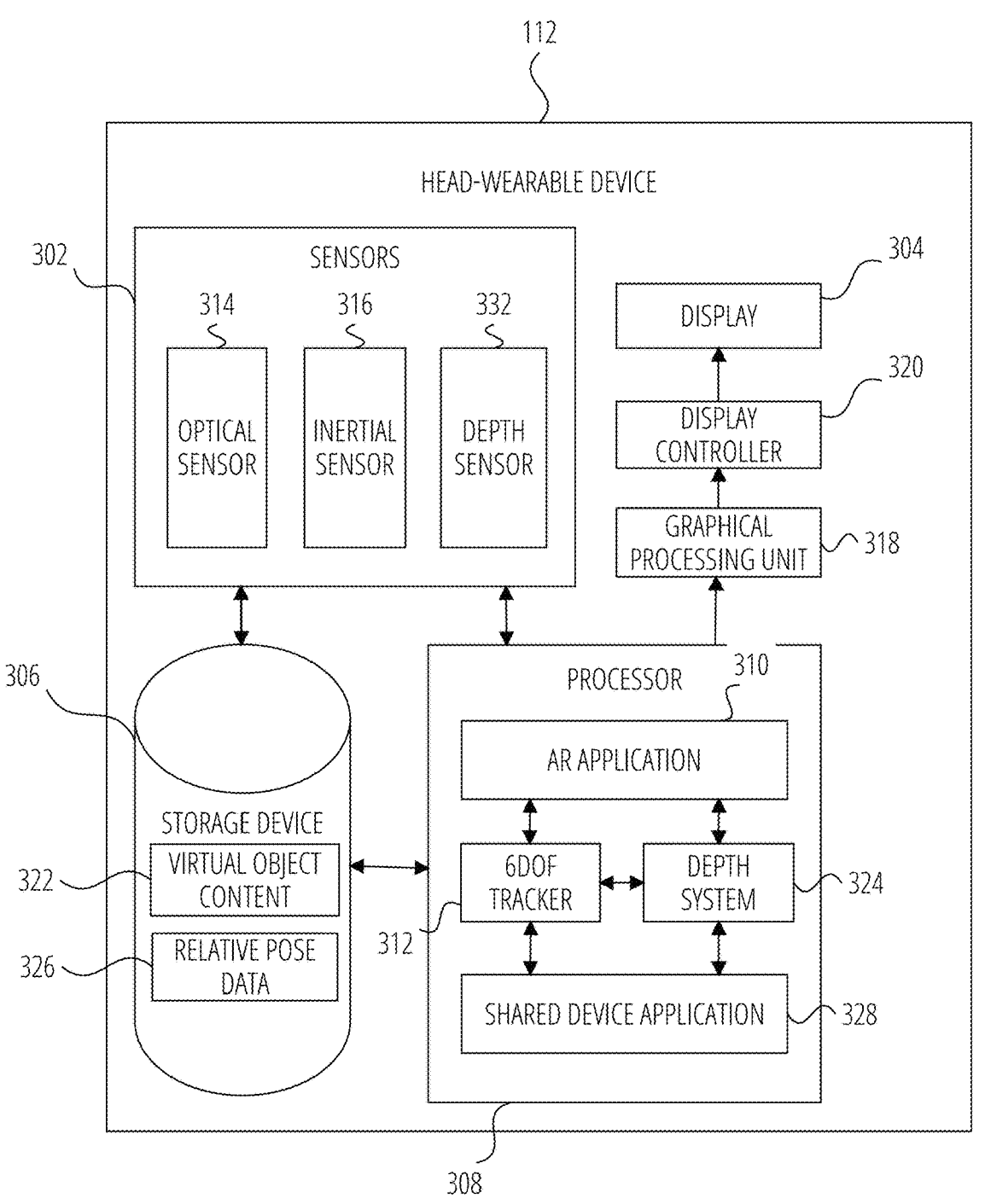
FIG. 3 is a block diagram illustrating a head-wearable device in accordance with one example embodiment.

FIG. 3 is a block diagram illustrating modules (e.g., components) of the head-wearable device 112, according to some example embodiments. The head-wearable device 112 includes sensors 302, a display 304, a processor 308, a Graphical processing unit 318, a display controller 320, and a storage device 306. Examples of the head-wearable device 112 include a wearable computing device such as smart glasses.

The sensors 302 include an optical sensor 314, an inertial sensor 316, and a depth sensor 332. The optical sensor 314 includes one or more cameras. The inertial sensor 316 includes a combination of a gyroscope, accelerometer, and magnetometer. Other examples of sensors 302 include a proximity or location sensor (e.g., near field communication, GPS, Bluetooth, Wifi), an audio sensor (e.g., a microphone), or any suitable combination thereof. It is noted that the sensors 302 described herein are for illustration purposes and the sensors 302 are thus not limited to the ones described above. The depth sensor 332 includes, for example, one or more of a structured light sensor, a time-of-flight sensor, a passive stereo sensor, an ultrasound device, or a time-of-flight sensor.

The display 304 includes a screen or monitor configured to display images generated by the processor 308. In one example embodiment, the display 304 may be transparent or semi-transparent so that the user 106 can see through the display 304 (in AR use case). In another example, the display 304, such as a LCOS display, presents each frame of virtual content in multiple presentations.

The processor 308 includes an AR application 310, a 6DOF tracker 312, a depth system 324, and a shared device application 328. The AR application 310 detects and identifies a physical environment or the physical object(s) 108 using computer vision. The AR application 310 retrieves a virtual object (e.g., 3D object model) based on the identified physical object(s) 108 or physical environment. The display 304 displays the virtual object. The AR application 310 includes a local rendering engine that generates a visualization of a virtual object overlaid (e.g., superimposed upon, or otherwise displayed in tandem with) on an image of the physical object(s) 108 captured by the optical sensor 314. A visualization of the virtual object may be manipulated by adjusting a position of the physical object(s) 108 (e.g., its physical location, orientation, or both) relative to the optical sensor 314. Similarly, the visualization of the virtual object may be manipulated by adjusting a pose of the head-wearable device 112 relative to the physical object(s) 108.

The 6DOF tracker 312 estimates a pose of the head-wearable device 112. For example, the 6DOF tracker 312 uses image data and corresponding inertial data from the optical sensor 314 and the inertial sensor 316 to track the location and pose of the head-wearable device 112 relative to a frame of reference (e.g., real world environment 102). In one example, the 6DOF tracker 312 uses the sensor data to determine the three-dimensional pose of the head-wearable device 112. The three-dimensional pose is a determined orientation and position of the head-wearable device 112 in relation to the user's real world environment 102. For example, the head-wearable device 112 may use images of the user's real world environment 102, as well as other sensor data to identify a relative position and orientation of the head-wearable device 112 from physical objects in the real world environment 102 surrounding the head-wearable device 112.

In one example embodiment, the 6DOF tracker 312 continually gathers and uses updated sensor data describing movements of the head-wearable device 112 to determine updated three-dimensional poses of the head-wearable device 112 that indicate changes in the relative position and orientation of the head-wearable device 112 from the physical objects in the real world environment 102. The 6DOF tracker 312 provides the three-dimensional pose of the head-wearable device 112 to the shared device application 328.

The depth system 324 accesses depth data from the depth sensor 332 to generate a dense point cloud. In another example embodiment, the head-wearable device 112 does not include the depth sensor 332 and uses a trained model based on images from optical sensor 314 to predict depths and generate the dense point cloud.

The shared device application 328 shares the dense point cloud from the depth system 324 and pose data from the 6DOF tracker 312 to the handheld device 114 or to server 110. The shared device application 328 can also receive dense point cloud and pose data from the handheld device 114 or the server 110. In one example, the shared device application 328 pairs coordinate systems of the head-wearable device 112 and the handheld device 114 by performing a registration of the dense point cloud based on the partially overlapped regions of the respective dense point clouds.

Once both the head-wearable device 112 and the handheld device 114 are paired, the shared device application 328 identifies the relative pose between the head-wearable device 112 and the handheld device 114. The AR application 310 uses the relative pose to enable the sharing of AR experience between the two AR devices. For example, the correct location/perspective of a virtual object is accurately presented in both the head-wearable device 112 and the handheld device 114 (e.g., user 116 points to a country on a virtual globe, head-wearable device 112 displays the virtual globe so that user 106 can see the same country that user 116 is pointing to (as perceived from the perspective of user 106). Example components of the shared device application 328 are described further below with respect to FIG. 6.

The Graphical processing unit 318 includes a render engine (not shown) that is configured to render a frame of a 3D model of a virtual object based on the virtual content provided by the AR application 310 and the pose of the head-wearable device 112. In other words, the Graphical processing unit 318 uses the three-dimensional pose of the head-wearable device 112 to generate frames of virtual content to be presented on the display 304. For example, the Graphical processing unit 318 uses the three-dimensional pose to render a frame of the virtual content such that the virtual content is presented at an orientation and position in the display 304 to properly augment the user's reality.

As an example, the Graphical processing unit 318 may use the three-dimensional pose data to render a frame of virtual content such that, when presented on the display 304, the virtual content overlaps with a physical object in the user's real world environment 102. The Graphical processing unit 318 generates updated frames of virtual content based on updated three-dimensional poses of the head-wearable device 112, which reflect changes in the position and orientation of the user in relation to physical objects in the user's real world environment 102.

The Graphical processing unit 318 transfers the rendered frame to the display controller 320. The display controller 320 is positioned as an intermediary between the Graphical processing unit 318 and the display 304, receives the image data (e.g., rendered frame) from the Graphical processing unit 318, and provides the rendered frame to display 304.

The storage device 306 stores virtual object content 322, relative pose data 326 (e.g., relative pose between head-wearable device 112 and handheld device 114), and a pre-trained model 330. The virtual object content 322 includes, for example, a database of visual references (e.g., images, QR codes) and corresponding virtual content (e.g., three-dimensional model of virtual objects). The relative pose data 326 indicates the relative pose between the first reference coordinate frame of the first AR device and a second reference coordinate frame of the second AR device by registering the first point cloud with the second point cloud based on corresponding predicted depths.

Any one or more of the modules described herein may be implemented using hardware (e.g., a Processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
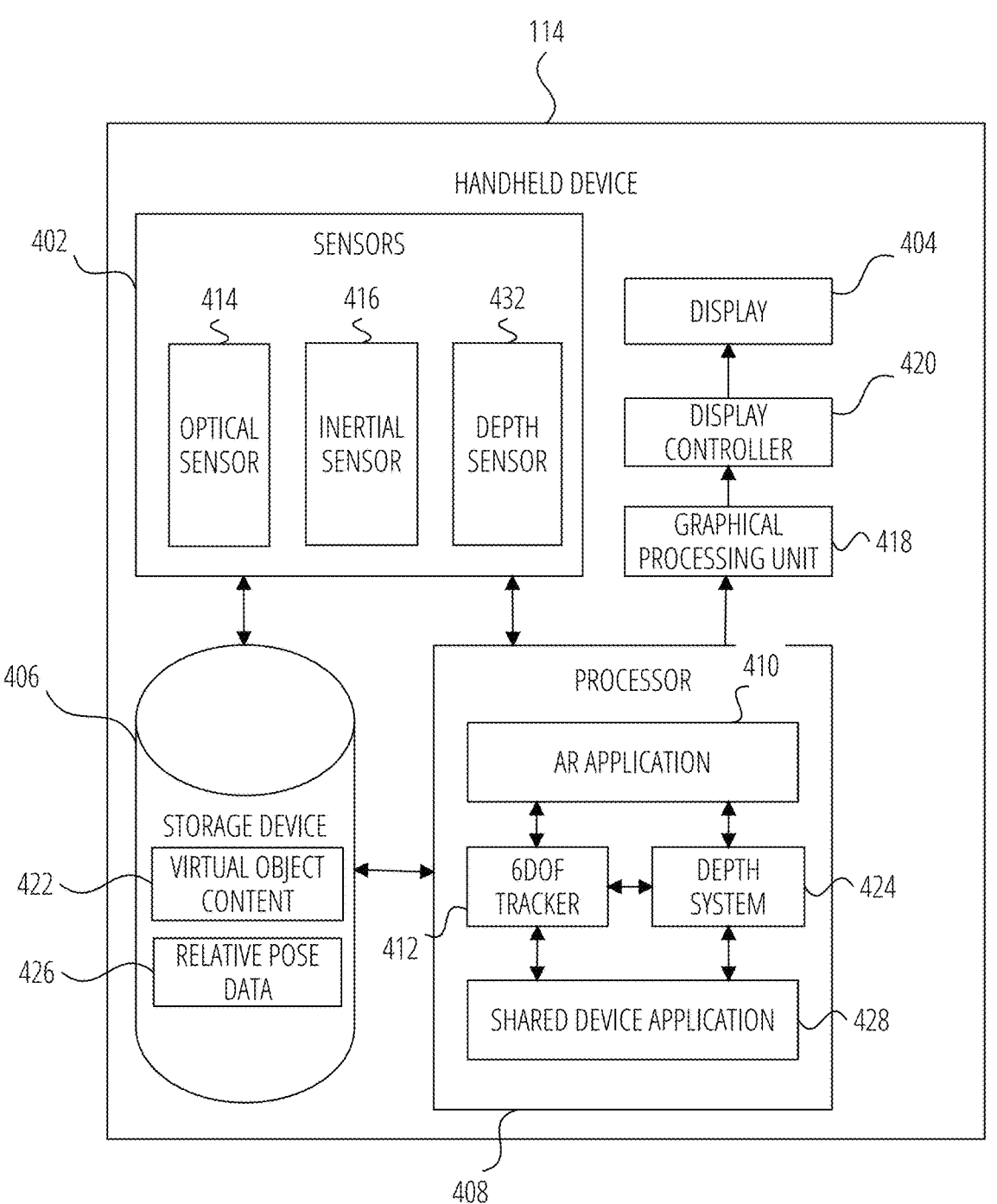
FIG. 4 is a block diagram illustrating a handheld device in accordance with one example embodiment.

FIG. 4 is a block diagram illustrating modules (e.g., components) of the handheld device 114, according to some example embodiments. The head-wearable device 112 includes sensors 402, a display 404, a processor 408, a Graphical processing unit 418, a display controller 420, and a storage device 406. Examples of the handheld device 114 include a handheld computing device, a tablet computer, or a smartphone.

The sensors 402 include an optical sensor 414, an inertial sensor 416, and a depth sensor 432. The optical sensor 414 includes one or more cameras. The inertial sensor 416 includes a combination of a gyroscope, accelerometer, and magnetometer. Other examples of sensors 402 include a proximity or location sensor (e.g., near field communication, GPS, Bluetooth, Wifi), an audio sensor (e.g., a microphone), or any suitable combination thereof. It is noted that the sensors 402 described herein are for illustration purposes and the sensors 402 are thus not limited to the ones described above. The depth sensor 432 includes, for example, a structured light sensor, a time-of-flight sensor, a passive stereo sensor, or an ultrasound device, time-of-flight sensor.

The display 404 includes a screen or monitor configured to display images generated by the processor 408. In one example embodiment, the display 404 presents each frame of virtual content in multiple presentations.

The processor 408 includes an AR application 410, a 6DOF tracker 412, a depth system 424, and a shared device application 428. The AR application 410 detects and identifies a physical environment or the physical object(s) 108 using computer vision. The AR application 410 retrieves a virtual object (e.g., 3D object model) based on the identified physical object(s) 108 or physical environment. The display 404 displays the virtual object. The AR application 410 includes a local rendering engine that generates a visualization of a virtual object overlaid (e.g., superimposed upon, or otherwise displayed in tandem with) on an image of the physical object(s) 108 captured by the optical sensor 414. A visualization of the virtual object may be manipulated by adjusting the position of the physical object(s) 108 (e.g., its physical location, orientation, or both) relative to the optical sensor 414. Similarly, the visualization of the virtual object may be manipulated by adjusting the pose of the handheld device 114 relative to the physical object(s) 108.

The 6DOF tracker 412 estimates a pose of the handheld device 114. For example, the 6DOF tracker 412 uses image data and corresponding inertial data from the optical sensor 414 and the inertial sensor 416 to track the location and pose of the head-wearable device 112 relative to a frame of reference (e.g., real world environment 102). In one example, the 6DOF tracker 412 uses sensor data to determine the three-dimensional pose of the handheld device 114. The three-dimensional pose is a determined orientation and position of the handheld device 114 in relation to the user's real world environment 102. For example, the handheld device 114 may use images of the user's real world environment 102, as well as other sensor data to identify a relative position and orientation of the handheld device 114 from physical objects in the real world environment 102. The 6DOF tracker 412 continually gathers and uses updated sensor data describing movements of the handheld device 114 to determine updated three-dimensional poses of the handheld device 114 that indicate changes in the relative position and orientation of the handheld device 114 from the physical objects in the real world environment 102. The 6DOF tracker 412 provides the three-dimensional pose of the handheld device 114 to the shared device application 428.

The depth system 424 accesses depth data from the depth sensor 432 to generate a dense point cloud. In another example embodiment, the handheld device 114 does not include the depth sensor 432 and uses a trained model based on images from optical sensor 414 to predict depths and generate the dense point cloud.

The shared device application 428 shares the dense point cloud from the depth system 424 and pose data from the 6DOF tracker 412 to the shared device application 428 or to server 110. The shared device application 428 can also receive dense point cloud and pose data from the head-wearable device 112 or the server 110. In one example, the shared device application 428 pairs coordinate systems of the head-wearable device 112 and the handheld device 114 by performing a registration of the dense point cloud based on the partially overlapped regions of the respective dense point clouds.

Once both the head-wearable device 112 and the handheld device 114 are paired, the shared device application 428 identifies the relative pose between the head-wearable device 112 and the handheld device 114. The AR application 410 uses the relative pose to enable the sharing of AR experience between the two AR devices. For example, the correct location/perspective of a virtual object is accurately presented in both the head-wearable device 112 and the handheld device 114 (e.g., user 116 points to a country on a virtual globe, head-wearable device 112 displays the virtual globe so that user 106 can see the same country that user 116 is pointing to (as perceived from the perspective of user 106). Example components of the shared device application 328 are described further below with respect to FIG. 7.

The Graphical processing unit 418 includes a render engine (not shown) that is configured to render a frame of a 3D model of a virtual object based on the virtual content provided by the AR application 410 and the pose of the handheld device 114. In other words, the Graphical processing unit 418 uses the three-dimensional pose of the handheld device 114 to generate frames of virtual content to be presented on the display 404. For example, the Graphical processing unit 418 uses the three-dimensional pose to render a frame of the virtual content such that the virtual content is presented at an orientation and position in the display 404 to properly augment user 116's view. As an example, the Graphical processing unit 418 may use the three-dimensional pose data to render a frame of virtual content such that, when presented on display 404, the virtual content overlaps with a physical object in the user's real world environment 102. The Graphical processing unit 418 generates updated frames of virtual content based on updated three-dimensional poses of the handheld device 114, which reflect changes in the position and orientation of the user in relation to physical objects in the user's real world environment 102.

The Graphical processing unit 418 transfers the rendered frame to the display controller 420. The display controller 420 is positioned as an intermediary between the Graphical processing unit 418 and the display 404, receives the image data (e.g., rendered frame) from the Graphical processing unit 418, and provides the rendered frame to display 404.

The storage device 406 stores virtual object content 422, relative pose data 426 (e.g., relative pose between head-wearable device 112 and handheld device 114). The virtual object content 422 includes, for example, a database of visual references (e.g., images, QR codes) and corresponding virtual content (e.g., a three-dimensional model of virtual objects). The relative pose data 426 indicates the relative pose between the first reference coordinate frame of the first AR device and a second reference coordinate frame of the second AR device by registering the first point cloud with the second point cloud based on corresponding predicted depths.

Any one or more of the modules described herein may be implemented using hardware (e.g., a Processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
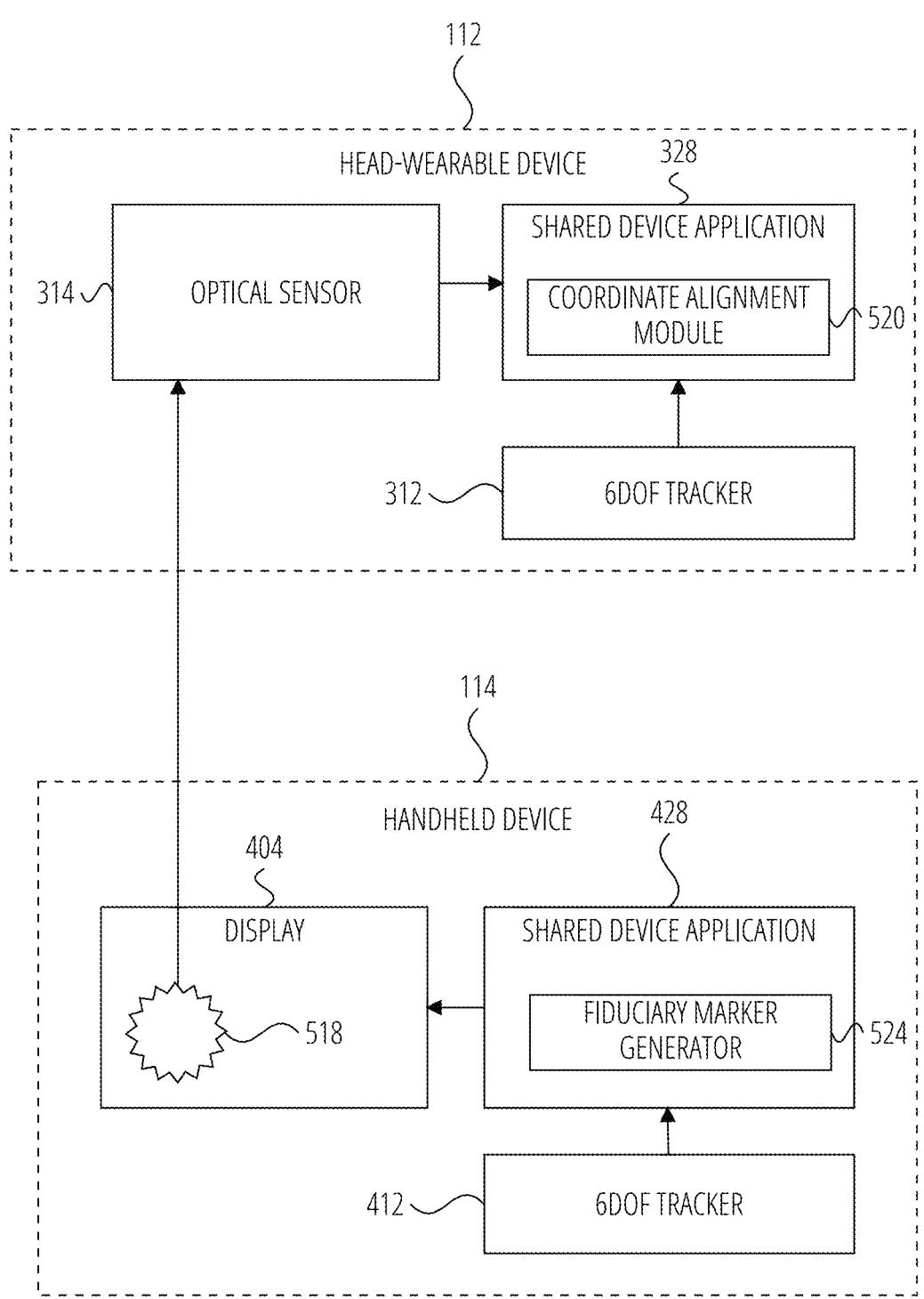
FIG. 5 is a block diagram illustrating a process for pairing a head-wearable device with a handheld device in accordance with one example embodiment.

FIG. 5 is a block diagram illustrating a process for pairing head-wearable device 112 with handheld device 114 in accordance with one example embodiment. The shared device application 428 of the handheld device 114 includes a fiduciary marker generator 524 that generates a fiduciary marker 518 based on pose data from 6DOF tracker 412. In another example, the fiduciary marker 518 includes metadata indicative of the pose of the handheld device 114, a coordinate reference of the handheld device 114, a point cloud from depth sensor 432, the AR application 410 operating at the handheld device 114, and a user account registered with AR application 410. In one example, the fiduciary marker 518 includes a QR code displayed with the display 404.

The optical sensor 314 captures an image of the fiduciary marker 518 and uses the shared device application 328 to pair the coordinate systems of the handheld device 114 and the head-wearable device 112. In one example, the shared device application 328 includes a coordinate alignment module 520 that decodes the fiduciary marker 518 to access the metadata. The coordinate alignment module 520 accesses the pose of the head-wearable device 112 in the coordinate system of the head-wearable device 112. The coordinate alignment module 520 aligns the coordinate system of the head-wearable device 112 with the handheld device 114 based on the pose of the head-wearable device 112, the pose of the handheld device 114, the coordinate system of the head-wearable device 112, and the coordinate system of the handheld device 114. In another example, the coordinate alignment module 520 communicates the shared coordinate system to the shared device application 428.

Figure 6:
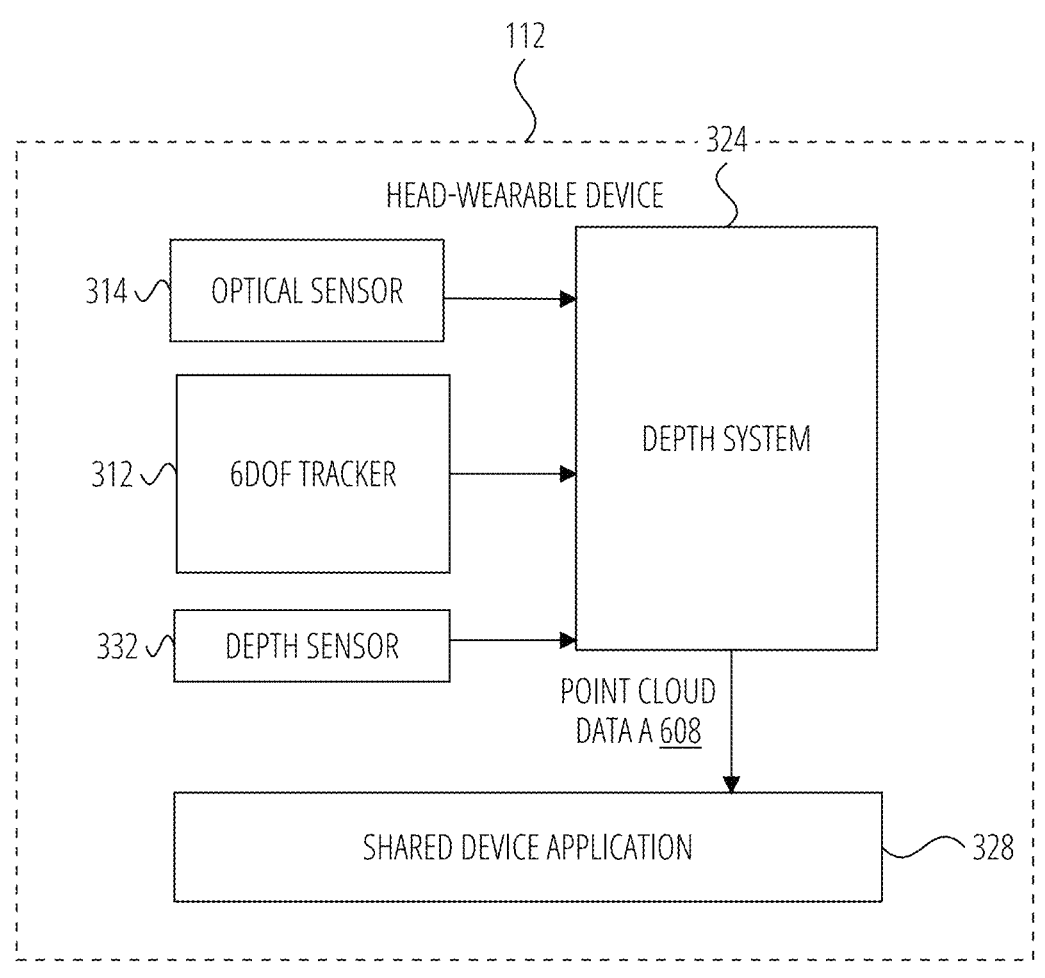
FIG. 6 is a block diagram illustrating a process for pairing from a head-wearable device in accordance with one example embodiment.

FIG. 6 is a block diagram illustrating a process for pairing from head-wearable device 112 in accordance with one example embodiment. The depth system 324 generates point cloud data A 608 based on data from the optical sensor 314, the 6DOF tracker 312, and depth sensor 332. The depth system 324 provides the point cloud data A 608 to the shared device application 328. The shared device application 328 communicates with the shared device application 428 of the handheld device 114.

Figure 7:
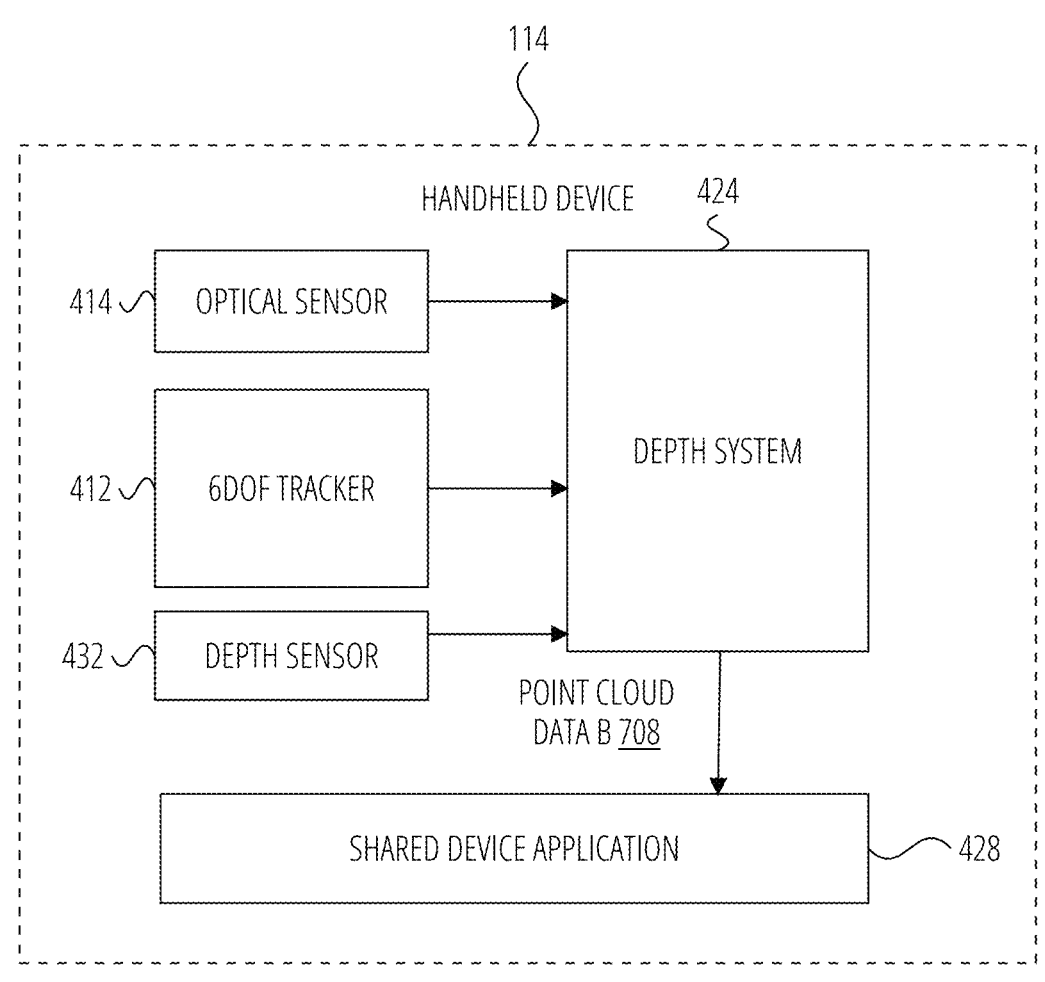
FIG. 7 is a block diagram illustrating a process for pairing from a handheld device in accordance with one example embodiment.

FIG. 7 is a block diagram illustrating a process for pairing from the handheld device 114 in accordance with one example embodiment. The depth system 424 generates point cloud data B 708 based on data from the optical sensor 414, 6DOF tracker 412, and depth sensor 432. The depth system 424 provides the point cloud data B 708 to the shared device application 428. The shared device application 428 communicates with the shared device application 328 of the head-wearable device 112.

Figure 8:
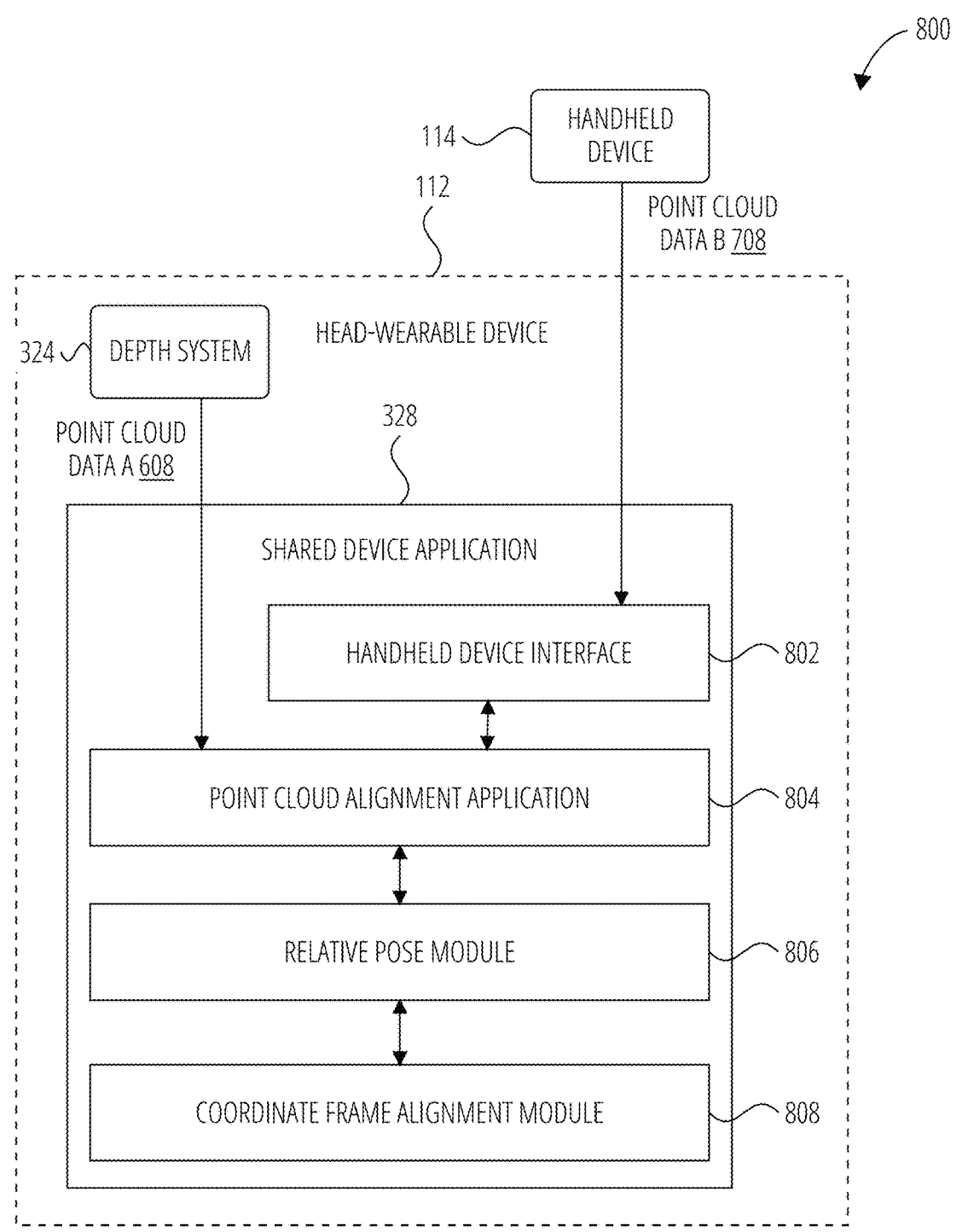
FIG. 8 is a block diagram illustrating a process for aligning a frame coordinate system at a head-wearable device in accordance with one example embodiment.

FIG. 8 is a block diagram illustrating a shared device application 328 in accordance with one example embodiment. The shared device application 328 includes a handheld device interface 802, a point cloud alignment application 804, a relative pose module 806, and a coordinate frame alignment module 808. The handheld device interface 802 is configured to communicate with handheld device 114 (e.g., via Bluetooth, wireless network). In one example, the handheld device interface 802 accesses the point cloud data B 810 from the handheld device 114.

The point cloud alignment application 804 accesses point cloud data A 608 from depth system 324 and point cloud data B 810 from handheld device interface 802. The point cloud alignment application 804 performs a joint alignment of both the point cloud data A 608 and point cloud data B 810. In one example, the point cloud alignment application 804 performs a Joint Registration of Multiple Point Sets (JRMPC) algorithm on the point cloud data A 608 and point cloud data B 810. In another example, the point cloud alignment application 804 performs an Iterative Closest Point (ICP) algorithm on the point cloud data A 608 and point cloud data B 810. Those of ordinary skills in the art will recognize that the point cloud alignment application 804 can use other joint point cloud alignment algorithms.

The relative pose module 806 determines the relative pose based on the aligned point cloud determined at point cloud alignment application 804. In one example, the relative pose module 806 determines the relative pose between the VIO reference frames of each AR device based on the aligned point cloud.

The coordinate frame alignment module 808 uses the relative pose to align in 3D the VIO reference coordinate frames of each AR device. It is noted that once the alignment of point cloud alignment application 804 is performed, connected AR devices (e.g., head-wearable device 112 and handheld device 114) do not need to be time-synced again. As such, the relative pose computation is performed only when the head-wearable device 112 and handheld device 114 are connected during a joint collaborative AR session (e.g., each AR device views the "same" virtual object in the real world environment 102). In another example, the coordinate frame alignment module 808 provides alignment data (e.g., relative pose of head-wearable device 112 relative to handheld device 114) to the AR application 310/graphical processing unit 318 for accurate placement/display of a virtual object.

Figure 9:
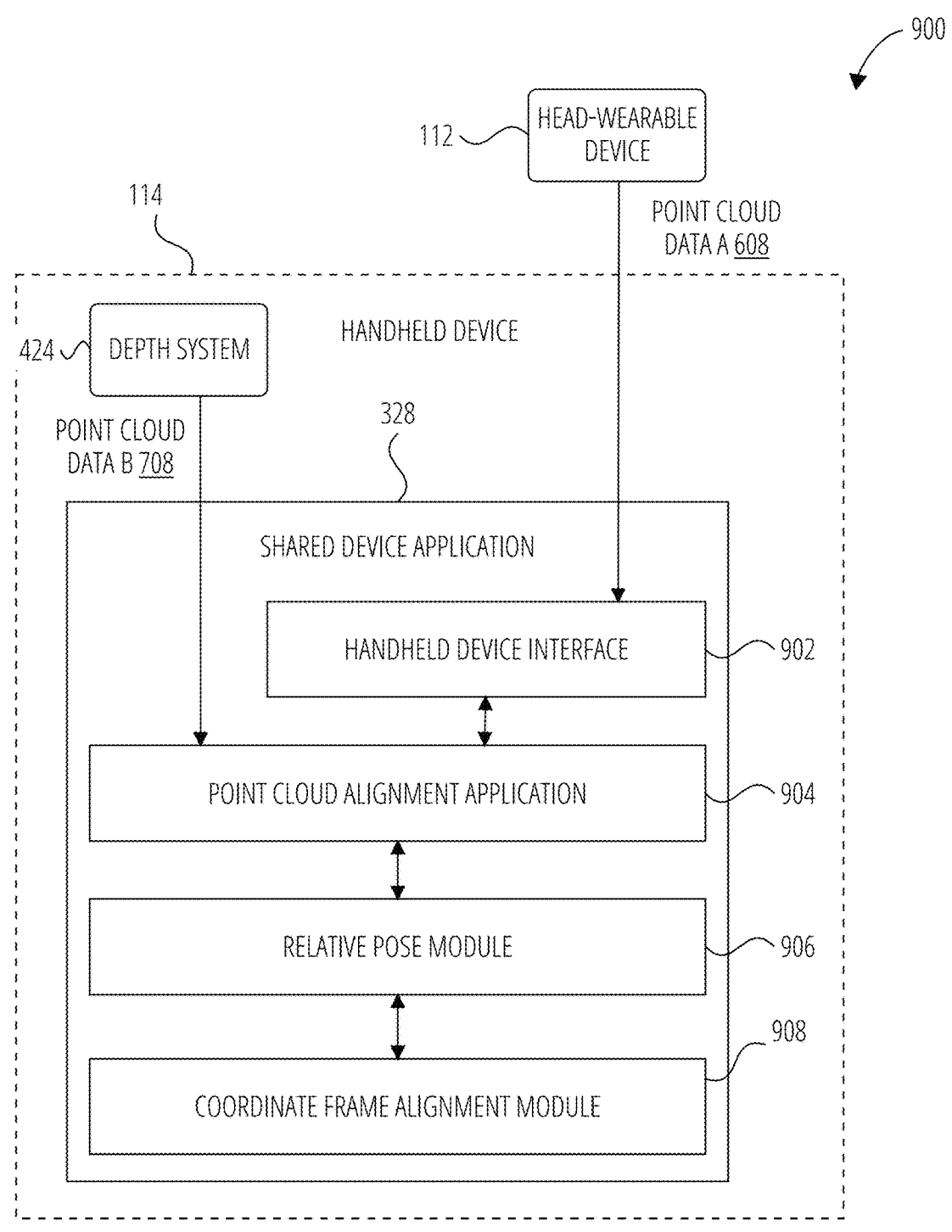
FIG. 9 is a block diagram illustrating a process for aligning a frame coordinate system at a head-wearable device in accordance with one example embodiment.

FIG. 9 is a block diagram illustrating a shared device application 328 in accordance with one example embodiment. The shared device application 328 includes a handheld device interface 902, a point cloud alignment application 904, a relative pose module 906, and a coordinate frame alignment module 908. The handheld device interface 902 is configured to communicate with head-wearable device 112 (e.g., via Bluetooth, wireless network). In one example, the handheld device interface 902 accesses the point cloud data A 608 from the head-wearable device 112.

The point cloud alignment application 904 accesses point cloud data B 708 from depth system 424 and point cloud data A 608 from handheld device interface 902. The point cloud alignment application 904 performs a joint alignment of both the point cloud data A 608 and point cloud data B 910. In one example, the point cloud alignment application 904 performs a Joint Registration of Multiple Point Sets (JRMPC) algorithm on the point cloud data A 608 and point cloud data B 910. In another example, the point cloud alignment application 904 performs an Iterative Closest Point (ICP) algorithm on the point cloud data A 608 and point cloud data B 910. Those of ordinary skills in the art will recognize that the point cloud alignment application 904 can use other joint point cloud alignment algorithms.

The relative pose module 906 determines the relative pose based on the aligned point cloud determined at point cloud alignment application 904. In one example, the relative pose module 906 determines the relative pose between the VIO reference frames of each AR device based on the aligned point cloud.

The coordinate frame alignment module 908 uses the relative pose to align in 3D the VIO reference coordinate frames of each AR device. It is noted that once the alignment of point cloud alignment application 904 is performed, connected AR devices (e.g., head-wearable device 112 and handheld device 114) do not need to be time-synced again. As such, the relative pose computation is performed only when the head-wearable device 112 and handheld device 114 are connected during a joint collaborative AR session (e.g., each AR device views the "same" virtual object in the real world environment 102). In another example, the coordinate frame alignment module 908 provides alignment data (e.g., relative pose of head-wearable device 112 relative to handheld device 114) to the AR application 310/graphical processing unit 318 for accurate placement/display of a virtual object.

Figure 10:
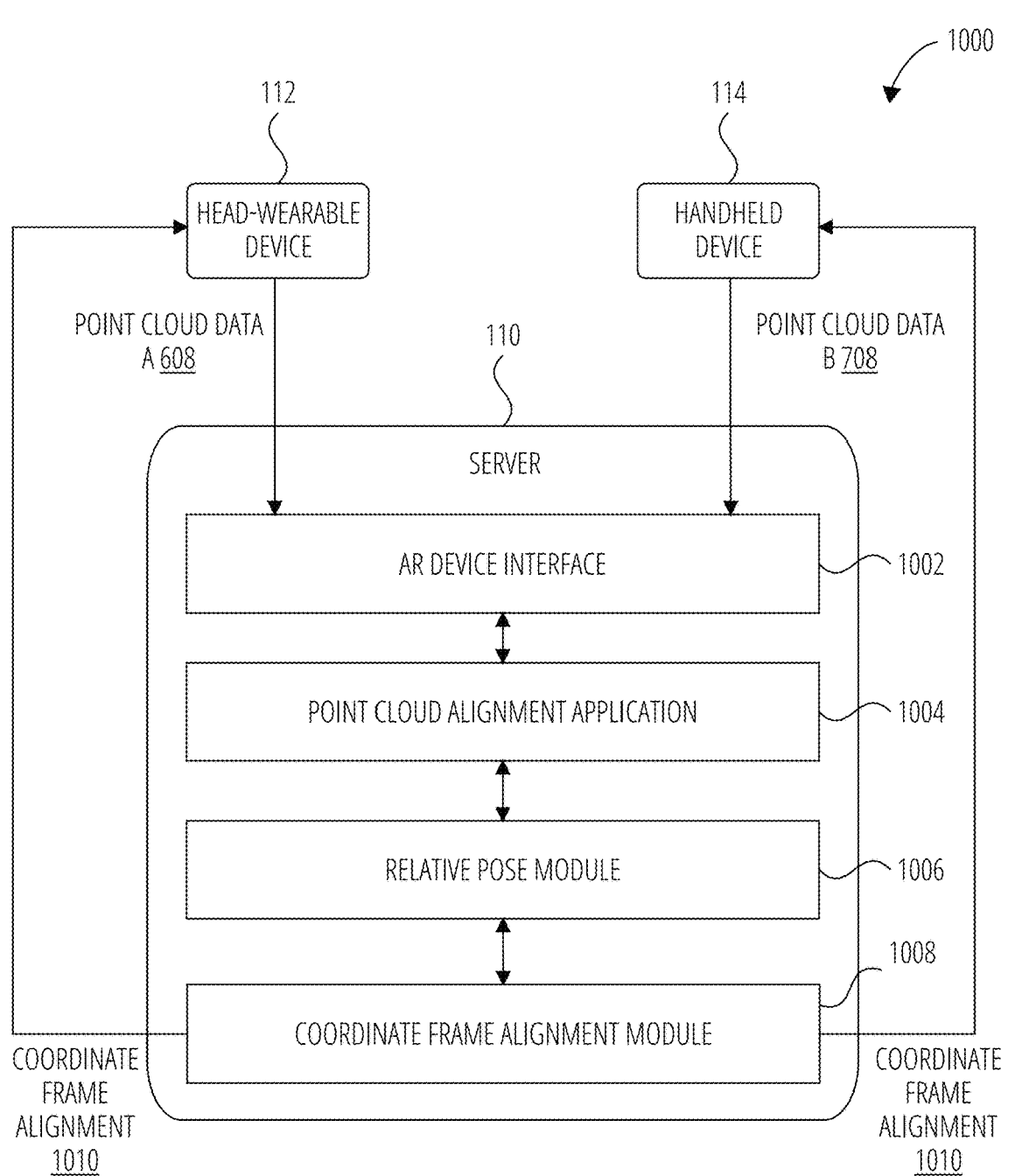
FIG. 10 is a block diagram illustrating a server in accordance with one example embodiment.

FIG. 10 is a block diagram illustrating a server 110 in accordance with one example embodiment. The server 110 includes an AR device interface 1002, a point cloud alignment application 1004, a relative pose module 1006, and a coordinate frame alignment module 1008. The AR device interface 1002 is configured to communicate with both head-wearable device 112 and handheld device 114. In one example, the AR device interface 1002 accesses the point cloud data A 608 from head-wearable device 112 and point cloud data B 810 from the handheld device 114.

The point cloud alignment application 1004 accesses point cloud data A 608 and point cloud data B 810 from AR device interface 1002. The point cloud alignment application 1004 performs a joint alignment of both the point cloud data A 608 and point cloud data B 810. In one example, the point cloud alignment application 1004 performs a Joint Registration of Multiple Point Sets (JRMPC) algorithm on the point cloud data A 608 and point cloud data B 810. In another example, the point cloud alignment application 1004 performs an Iterative Closest Point (ICP) algorithm on the point cloud data A 608 and point cloud data B 810. Those of ordinary skills in the art will recognize that the point cloud alignment application 1004 can use other joint point cloud alignment algorithms.

The relative pose module 1006 determines the relative pose based on the aligned point cloud performed at point cloud alignment application 1004. In one example, the relative pose module 1006 determines the relative pose between the VIO reference frames of each AR device based on the aligned point cloud.

The coordinate frame alignment module 1008 uses the relative pose to align in 3D the VIO reference coordinate frames of each AR device. In one example, the coordinate frame alignment module 808 provides coordinate frame alignment 1010 (e.g., relative pose of head-wearable device 112 relative to handheld device 114) to the head-wearable device 112 and handheld device 114 for accurate placement/display of a virtual object.

Figure 11:
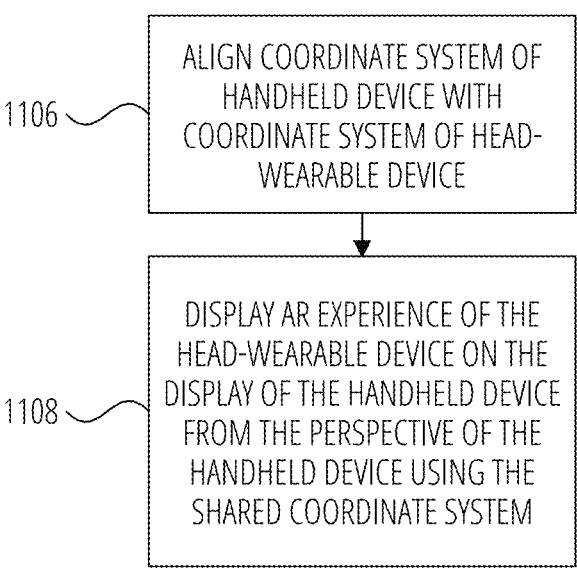
FIG. 11 illustrates a method for displaying an AR experience using a shared coordinate system in accordance with one example embodiment.

FIG. 11 illustrates an example routine for displaying an AR experience using a shared coordinate system in accordance with one example embodiment. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes aligning the coordinate system of handheld device 114 with the coordinate system of head-wearable device 112 at block 1106.

According to some examples, the method includes displaying the AR experience of the head-wearable device 112 on the display of the handheld device 114 from the perspective of the head-wearable device 112 using the shared coordinate system at block 1108.

FIG. 12 illustrates an example routine for aligning coordinate systems using a fiduciary market in accordance with one example embodiment. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes generating a fiduciary marker on the handheld device 114 at block 1202.

According to some examples, the method includes displaying the fiduciary marker in a display of the handheld device 114 at block 1204.

According to some examples, the method includes aligning the coordinate system of handheld device 114 with the coordinate system of head-wearable device 112 using the fiduciary marker at block 1206.

According to some examples, the method includes displaying the AR experience of the head-wearable device 112 on the display of the handheld device 114 from the perspective of the handheld device 114 using the shared coordinate system at block 1208.

FIG. 13 is a flow diagram illustrating a method 1300 for aligning reference coordinate frames in accordance with one example embodiment. Operations in the method 1300 may be performed by the head-wearable device 112, using components (e.g., modules, engines) described above with respect to FIG. 8. Accordingly, the method 1300 is described by way of example with reference to the head-wearable device 112. However, it shall be appreciated that at least some of the operations of the method 1300 may be deployed on various other hardware configurations or be performed by similar components residing elsewhere.

In block 1302, the shared device application 328 receives point cloud data from depth system 324 of head-wearable device 112 and handheld device 114. In block 1304, the point cloud alignment application 804 aligns point cloud data from head-wearable device 112 and handheld device 114. In block 1306, the relative pose module 806 determines the relative pose of the head-wearable device 112 and handheld device 114. In block 1308, the coordinate frame alignment module 808 aligns reference coordinate frames based on the relative pose. In block 1310, the coordinate frame alignment module 808 provides the aligned reference coordinate frame to AR application 310 of head-wearable device 112 and/or handheld device 114.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 14:
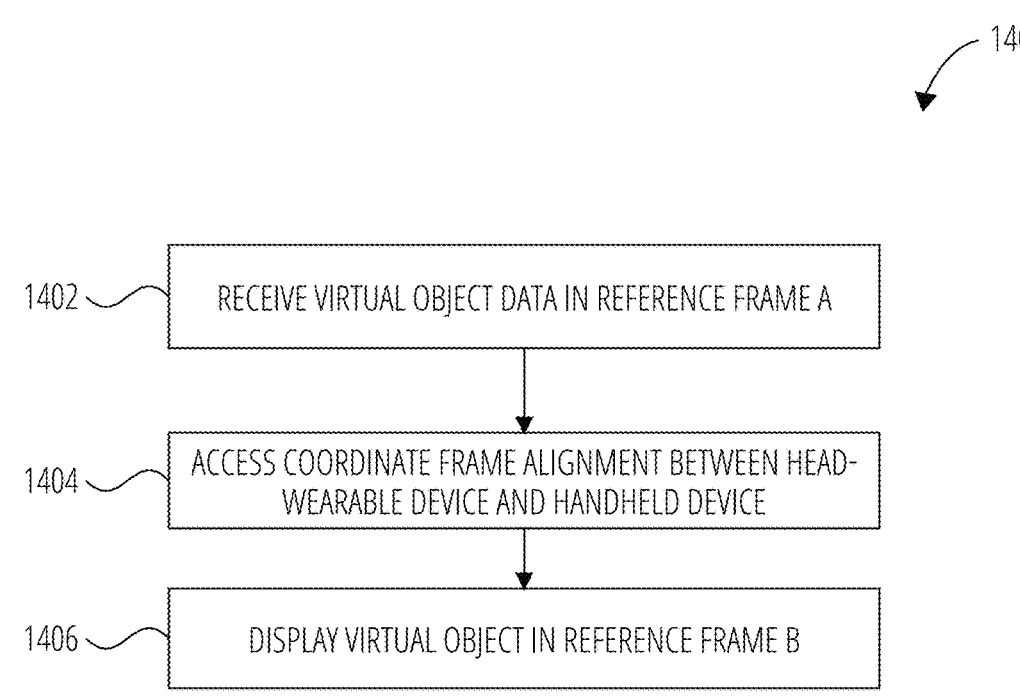
FIG. 14 is a flow diagram illustrating a method for sharing an AR experience in accordance with one example embodiment.

FIG. 14 is a flow diagram illustrating a method 1400 for sharing an AR experience in accordance with one example embodiment. Operations in the method 1400 may be performed by the head-wearable device 112, using components (e.g., modules, engines) described above with respect to FIG. 3. Accordingly, the method 1400 is described by way of example with reference to the head-wearable device 112. However, it shall be appreciated that at least some of the operations of the method 1400 may be deployed on various other hardware configurations or be performed by similar components residing elsewhere.

In block 1402, the shared device application 328 receives virtual object data in reference frame b (e.g., the reference frame of handheld device 114). In block 1404, the shared device application 328 accesses coordinate frame alignment between head-wearable device 112 and handheld device 114. In block 1406, the AR application 310 displays a virtual object in reference frame a (e.g., reference frame of head-wearable device 112).

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 15:
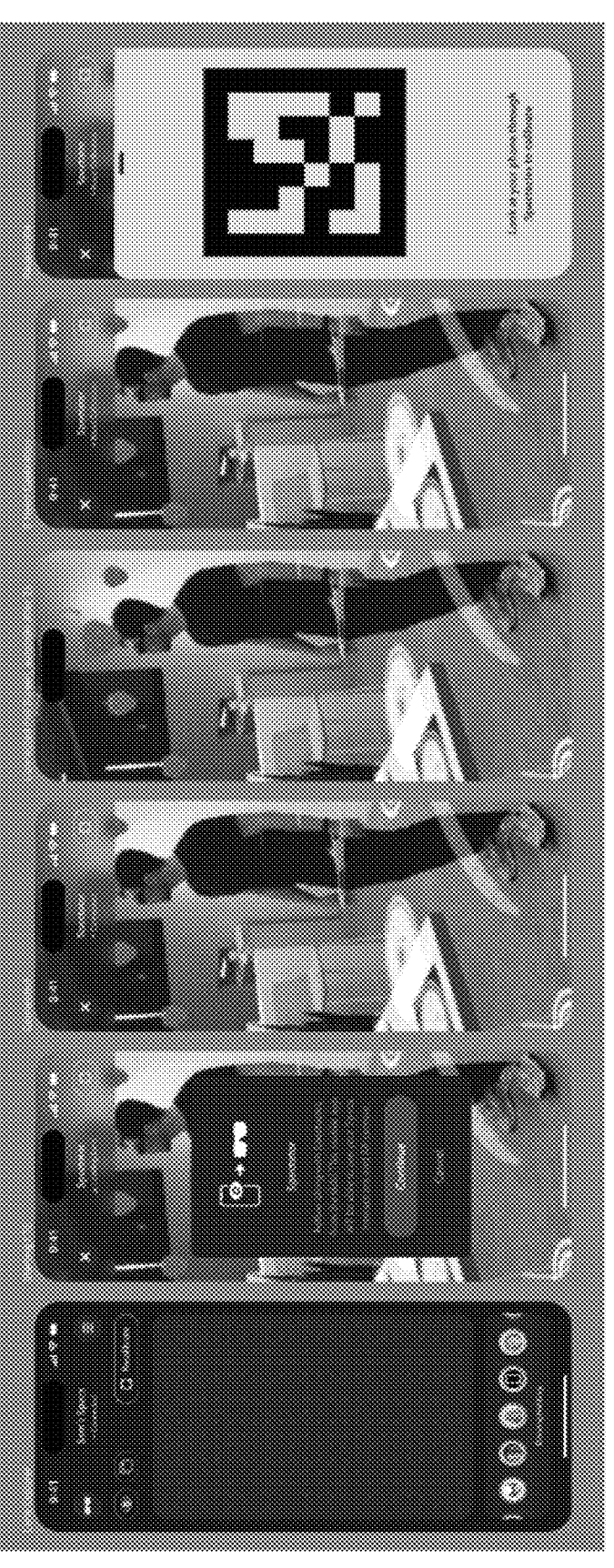
FIG. 15 illustrates an example graphical user interface on a handheld device in accordance with one example embodiment.

FIG. 15 illustrates an example GUI 1504 on the handheld device 114 in accordance with one example embodiment. An example of a QR code 1506 is displayed on the handheld device 114.

System with Head-Wearable Apparatus

Figure 16:
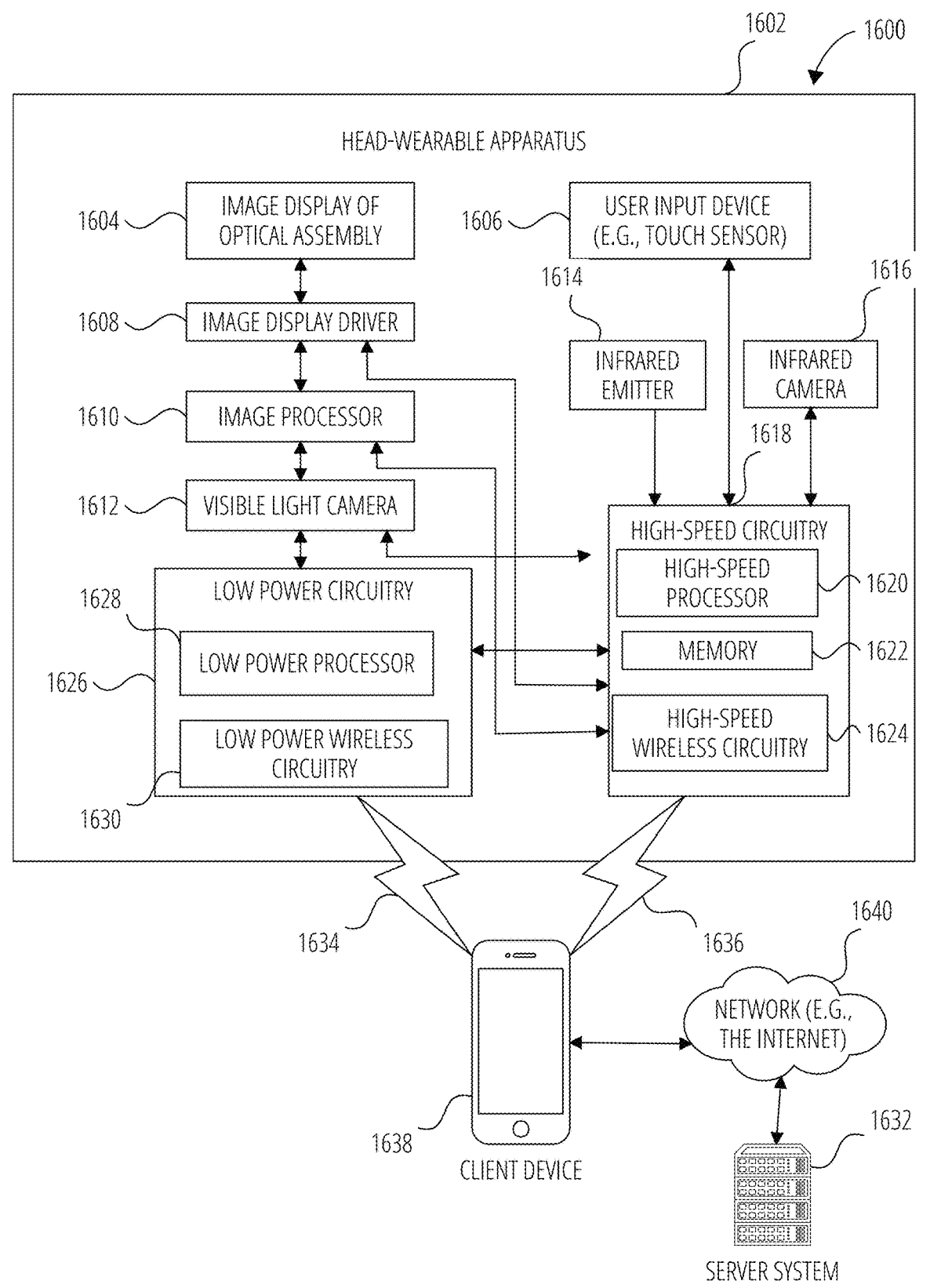
FIG. 16 illustrates a network environment in which a head-wearable device can be implemented according to one example embodiment.

FIG. 16 illustrates a network environment 1600 in which the head-wearable apparatus 1602 can be implemented according to one example embodiment. FIG. 16 is a high-level functional block diagram of an example head-wearable apparatus 1602 communicatively coupled a mobile client device 1638 and a server system 1632 via various network 1640.

head-wearable apparatus 1602 includes a camera, such as at least one of visible light camera 1612, infrared emitter 1614 and infrared camera 1616. The client device 1638 can be capable of connecting with head-wearable apparatus 1602 using both a communication 1634 and a communication 1636. client device 1638 is connected to server system 1632 and network 1640. The network 1640 may include any combination of wired and wireless connections.

The head-wearable apparatus 1602 further includes two image displays of the image display of optical assembly 1604. The two include one associated with the left lateral side and one associated with the right lateral side of the head-wearable apparatus 1602. The head-wearable apparatus 1602 also includes image display driver 1608, image processor 1610, low-power low power circuitry 1626, and high-speed circuitry 1618. The image display of optical assembly 1604 are for presenting images and videos, including an image that can include a graphical user interface to a user of the head-wearable apparatus 1602.

The image display driver 1608 commands and controls the image display of the image display of optical assembly 1604. The image display driver 1608 may deliver image data directly to the image display of the image display of optical assembly 1604 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1602 includes a frame and stems (or temples) extending from a lateral side of the frame. The head-wearable apparatus 1602 further includes a user input device 1606 (e.g., touch sensor or push button) including an input surface on the head-wearable apparatus 1602. The user input device 1606 (e.g., touch sensor or push button) is to receive from the user an input selection to manipulate the graphical user interface of the presented image.

The components shown in FIG. 16 for the head-wearable apparatus 1602 are located on one or more circuit boards, for example a PCB or flexible PCB, in the rims or temples. Alternatively, or additionally, the depicted components can be located in the chunks, frames, hinges, or bridge of the head-wearable apparatus 1602. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1602 includes a memory 1622 which stores instructions to perform a subset or all of the functions described herein. memory 1622 can also include storage device.

As shown in FIG. 16, high-speed circuitry 1618 includes high-speed processor 1620, memory 1622, and high-speed wireless circuitry 1624. In the example, the image display driver 1608 is coupled to the high-speed circuitry 1618 and operated by the high-speed processor 1620 in order to drive the left and right image displays of the image display of optical assembly 1604. high-speed processor 1620 may be any processor capable of managing high-speed communications and operation of any general computing system needed for head-wearable apparatus 1602. The high-speed processor 1620 includes processing resources needed for managing high-speed data transfers on communication 1636 to a wireless local area network (WLAN) using high-speed wireless circuitry 1624. In certain examples, the high-speed processor 1620 executes an operating system such as a LINUX operating system or other such operating system of the head-wearable apparatus 1602 and the operating system is stored in memory 1622 for execution. In addition to any other responsibilities, the high-speed processor 1620 executing a software architecture for the head-wearable apparatus 1602 is used to manage data transfers with high-speed wireless circuitry 1624. In certain examples, high-speed wireless circuitry 1624 is configured to implement Institute of Electrical and Electronic Engineers (IEEE) 1602.11 communication standards, also referred to herein as Wi-Fi. In other examples, other high-speed communications standards may be implemented by high-speed wireless circuitry 1624.

The low power wireless circuitry 1630 and the high-speed wireless circuitry 1624 of the head-wearable apparatus 1602 can include short range transceivers (Bluetooth™) and wireless wide, local, or wide area network transceivers (e.g., cellular or WiFi). The client device 1638, including the transceivers communicating via the communication 1634 and communication 1636, may be implemented using details of the architecture of the head-wearable apparatus 1602, as can other elements of network 1640.

The memory 1622 includes any storage device capable of storing various data and applications, including, among other things, camera data generated by the left and right, infrared camera 1616, and the image processor 1610, as well as images generated for display by the image display driver 1608 on the image displays of the image display of optical assembly 1604. While memory 1622 is shown as integrated with high-speed circuitry 1618, in other examples, memory 1622 may be an independent standalone element of the head-wearable apparatus 1602. In certain such examples, electrical routing lines may provide a connection through a chip that includes the high-speed processor 1620 from the image processor 1610 or low power processor 1628 to the memory 1622. In other examples, the high-speed processor 1620 may manage addressing of memory 1622 such that the low power processor 1628 will boot the high-speed processor 1620 any time that a read or write operation involving memory 1622 is needed.

As shown in FIG. 16, the low power processor 1628 or high-speed processor 1620 of the head-wearable apparatus 1602 can be coupled to the camera (visible light camera 1612; infrared emitter 1614, or infrared camera 1616), the image display driver 1608, the user input device 1606 (e.g., touch sensor or push button), and the memory 1622.

The head-wearable apparatus 1602 is connected with a host computer. For example, the head-wearable apparatus 1602 is paired with the client device 1638 via the communication 1636 or connected to the server system 1632 via the network 1640. server system 1632 may be one or more computing devices as part of a service or network computing system, for example, that include a processor, a memory, and network communication interface to communicate over the network 1640 with the client device 1638 and head-wearable apparatus 1602.

The client device 1638 includes a processor and a network communication interface coupled to the processor. The network communication interface allows for communication over the network 1640, communication 1634 or communication 1636. client device 1638 can further store at least portions of the instructions for generating a binaural audio content in the client device 1638's memory to implement the functionality described herein.

Output components of the head-wearable apparatus 1602 include visual components, such as a display such as a liquid crystal display (LCD), a plasma display panel (PDP), a light emitting diode (LED) display, a projector, or a waveguide. The image displays of the optical assembly are driven by the image display driver 1608. The output components of the head-wearable apparatus 1602 further include acoustic components (e.g., speakers), haptic components (e.g., a vibratory motor), other signal generators, and so forth. The input components of the head-wearable apparatus 1602, the client device 1638, and server system 1632, such as the user input device 1606, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1602 may optionally include additional peripheral device elements. Such peripheral device elements may include biometric sensors, additional sensors, or display elements integrated with head-wearable apparatus 1602. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1636 from the client device 1638 via the low power wireless circuitry 1630 or high-speed wireless circuitry 1624.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

FIG. 17 is a block diagram 1700 illustrating a software architecture 1704, which can be installed on any one or more of the devices described herein. The software architecture 1704 is supported by hardware such as a machine 1702 that includes Processors 1720, memory 1726, and I/O Components 1738. In this example, the software architecture 1704 can be conceptualized as a stack of layers, where each layer provides a particular functionality. The software architecture 1704 includes layers such as an operating system 1712, libraries 1710, frameworks 1708, and applications 1706. Operationally, the applications 1706 invoke API calls 1750 through the software stack and receive messages 1752 in response to the API calls 1750.

The operating system 1712 manages hardware resources and provides common services. The operating system 1712 includes, for example, a kernel 1714, services 1716, and drivers 1722. The kernel 1714 acts as an abstraction layer between the hardware and the other software layers. For example, the kernel 1714 provides memory management, Processor management (e.g., scheduling), Component management, networking, and security settings, among other functionality. The services 1716 can provide other common services for the other software layers. The drivers 1722 are responsible for controlling or interfacing with the underlying hardware. For instance, the drivers 1722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1710 provide a low-level common infrastructure used by the applications 1706. The libraries 1710 can include system libraries 1718 (e.g., C standard library) that provide functions such as memory allocation functions, string manipulation functions, mathematic functions, and the like. In addition, the libraries 1710 can include API libraries 1724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1710 can also include a wide variety of other libraries 1728 to provide many other APIs to the applications 1706.

The frameworks 1708 provide a high-level common infrastructure that is used by the applications 1706. For example, the frameworks 1708 provide various graphical user interface (GUI) functions, high-level resource management, and high-level location services. The frameworks 1708 can provide a broad spectrum of other APIs that can be used by the applications 1706, some of which may be specific to a particular operating system or platform.

In an example embodiment, the applications 1706 may include a home application 1736, a contacts application 1730, a browser application 1732, a book reader application 1734, a location application 1742, a media application 1744, a messaging application 1746, a game application 1748, and a broad assortment of other applications such as a third-party application 1740. The applications 1706 are programs that execute functions defined in the programs. Various programming languages can be employed to create one or more of the applications 1706, structured in a variety of manners, such as object-oriented programming languages (e.g., Objective-C, Java, or C++) or procedural programming languages (e.g., C or assembly language). In a specific example, the third-party application 1740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1740 can invoke the API calls 1750 provided by the operating system 1712 to facilitate functionality described herein.

Figure 18:
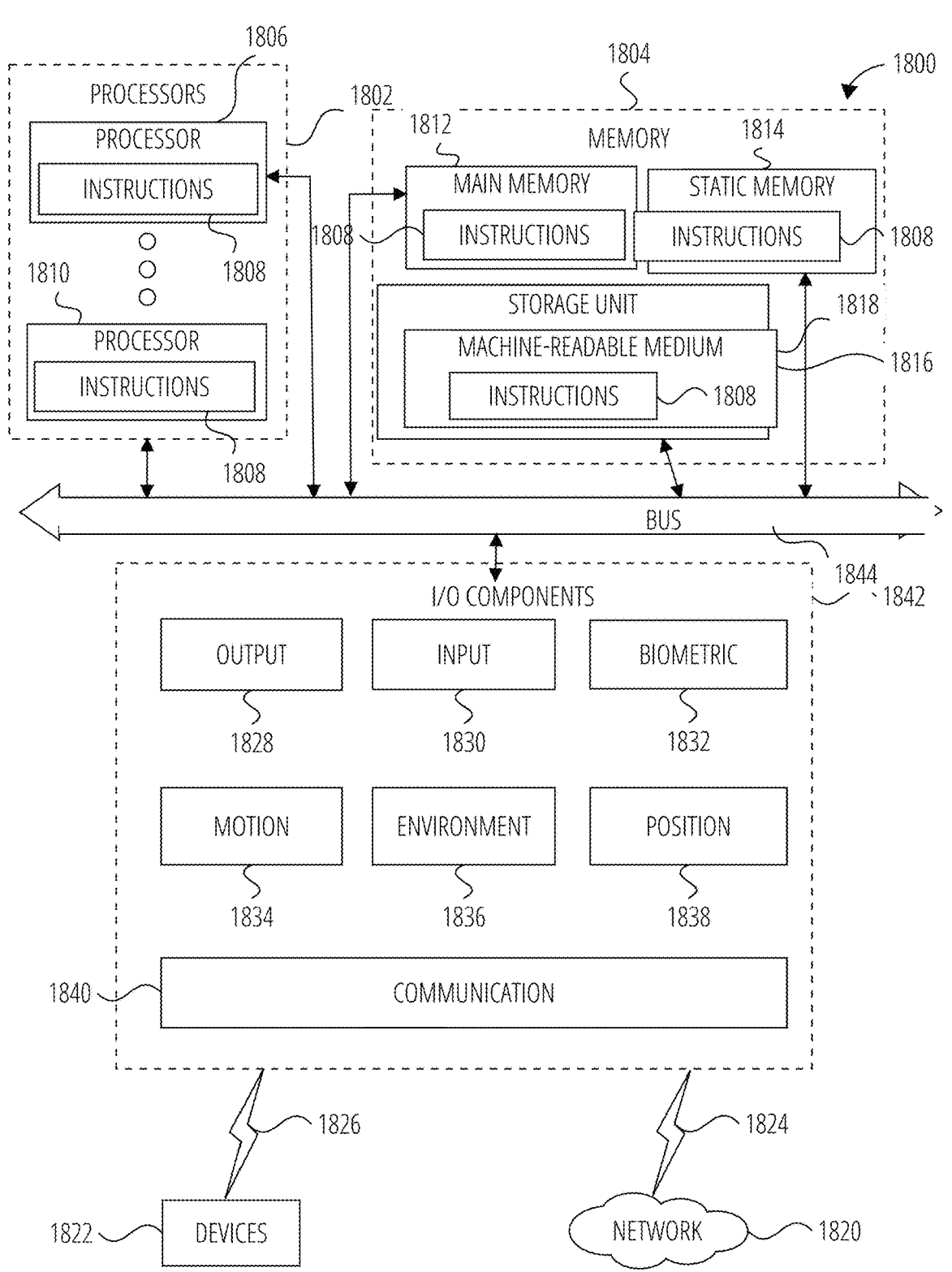
FIG. 18 is a diagrammatic representation of a machine in the form of a computer system within which a set of instructions may be executed for causing the machine to perform any one or more of the methodologies discussed herein, according to one example embodiment.

FIG. 18 is a diagrammatic representation of the machine 1800 within which instructions 1808 (e.g., software, a program, an application, an applet, an app, or other executable code) for causing the machine 1800 to perform any one or more of the methodologies discussed herein may be executed. For example, the instructions 1808 may cause the machine 1800 to execute any one or more of the methods described herein. The instructions 1808 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1808, sequentially or otherwise, that specify actions to be taken by the machine 1800. Further, while only a single machine 1800 is illustrated, the term "machine" shall also be taken to include a collection of machines that individually or jointly execute the instructions 1808 to perform any one or more of the methodologies discussed herein.

The machine 1800 may include Processors 1802, memory 1804, and I/O Components 1842, which may be configured to communicate with each other via a bus 1844. In an example embodiment, the Processors 1802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1806 and a Processor 1810 that execute the instructions 1808. The term "Processor" is intended to include multi-core Processors that may comprise two or more independent Processors (sometimes referred to as "cores") that may execute instructions contemporaneously. Although FIG. 18 shows multiple Processors 1802, the machine 1800 may include a single Processor with a single core, a single Processor with multiple cores (e.g., a multi-core Processor), multiple Processors with a single core, multiple Processors with multiples cores, or any combination thereof.

The memory 1804 includes a main memory 1812, a static memory 1814, and a storage unit 1816, both accessible to the Processors 1802 via the bus 1844. The main memory 1804, the static memory 1814, and storage unit 1816 store the instructions 1808 embodying any one or more of the methodologies or functions described herein. The instructions 1808 may also reside, completely or partially, within the main memory 1812, within the static memory 1814, within machine-readable medium 1818 within the storage unit 1816, within at least one of the Processors 1802 (e.g., within the Processor's cache memory), or any suitable combination thereof, during execution thereof by the machine 1800.

The I/O Components 1842 may include a wide variety of Components to receive input, provide output, produce output, transmit information, exchange information, capture measurements, and so on. The specific I/O Components 1842 that are included in a particular machine will depend on the type of machine. For example, portable machines such as mobile phones may include a touch input device or other such input mechanisms, while a headless server machine will likely not include such a touch input device. It will be appreciated that the I/O Components 1842 may include many other Components that are not shown in FIG. 18. In various example embodiments, the I/O Components 1842 may include output Components 1828 and input Components 1830. The output Components 1828 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1830 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1842 may include biometric Components 1832, motion Components 1834, environmental Components 1836, or position Components 1838, among a wide array of other Components. For example, the biometric Components 1832 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1834 include acceleration sensor Components (e.g., accelerometer), gravitation sensor Components, rotation sensor Components (e.g., gyroscope), and so forth. The environmental Components 1836 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1838 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1842 further include communication Components 1840 operable to couple the machine 1800 to a network 1820 or devices 1822 via a coupling 1824 and a coupling 1826, respectively. For example, the communication Components 1840 may include a network interface Component or another suitable device to interface with the network 1820. In further examples, the communication Components 1840 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1822 may be another machine or any of a wide variety of peripheral devices (e.g., a peripheral device coupled via a USB).

Moreover, the communication Components 1840 may detect identifiers or include Components operable to detect identifiers. For example, the communication Components 1840 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1840, such as location via Internet Protocol (IP) geolocation, location via Wi-Fi® signal triangulation, location via detecting an NFC beacon signal that may indicate a particular location, and so forth.

The various memories (e.g., memory 1804, main memory 1812, static memory 1814, and/or memory of the Processors 1802) and/or storage unit 1816 may store one or more sets of instructions and data structures (e.g., software) embodying or used by any one or more of the methodologies or functions described herein. These instructions (e.g., the instructions 1808), when executed by Processors 1802, cause various operations to implement the disclosed embodiments.

The instructions 1808 may be transmitted or received over the network 1820, using a transmission medium, via a network interface device (e.g., a network interface Component included in the communication Components 1840) and using any one of a number of well-known transfer protocols (e.g., hypertext transfer protocol (HTTP)). Similarly, the instructions 1808 may be transmitted or received using a transmission medium via the coupling 1826 (e.g., a peer-to-peer coupling) to the devices 1822.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
pairing a head-wearable device with a handheld device to establish a shared coordinate system by:
generating, by the handheld device, a fiducial marker in a display of the handheld device, the fiducial marker encoding a six-degrees-of-freedom (6DOF) pose of the handheld device;
capturing, by a camera of the head-wearable device, an image of the fiducial marker displayed on the handheld device;
decoding, by the head-wearable device, the fiducial marker to recover the encoded 6DOF pose of the handheld device;
computing, by the head-wearable device, a rigid-body transform between the head-wearable device and the handheld device based on a pose of the head-wearable device and the recovered 6DOF pose of the handheld device; and aligning a coordinate system of the head-wearable device with a coordinate system of the handheld device using the computed rigid-body transform to establish the shared coordinate system; and displaying, based on a pose of the handheld device, a virtual object of a first mixed reality application operating at the head-wearable device, with a second mixed reality application operating at the handheld device using the shared coordinate system.

2. The method of claim 1, wherein displaying the virtual object comprises:

rendering the virtual object on the handheld device from a viewpoint that is spatially displaced from, and outside, a current field of view of the head-wearable device, such that the handheld device provides a third-person perspective based on the pose of the head-wearable device in the shared coordinate system and the pose of the handheld device in the shared coordinate system.

3. The method of claim 1, wherein the first mixed reality application and the second mixed reality application are both registered with a same user account.

4. The method of claim 1, wherein the first mixed reality application is registered with a first user account and the second mixed reality application is registered with a second user account.

5. The method of claim 1, wherein pairing comprises:

aligning a first coordinate system of the head-wearable device with a second coordinate system of the handheld device; and establishing the shared coordinate system for both the head-wearable device and the handheld device based on aligning the first coordinate system and the second coordinate system.

6. The method of claim 5, wherein aligning the first coordinate system of the head-wearable device with the second coordinate system of the handheld device comprises:

displaying a fiduciary marker in the display of the handheld device, the fiduciary marker being based on the pose of the handheld device;

capturing a picture of the fiduciary marker with the camera of the head-wearable device;

in response to capturing the picture of the fiduciary marker, identifying the pose of the handheld device based on the picture of the fiduciary marker;

in response to capturing the picture of the fiduciary marker, identifying the pose of the head-wearable device; and aligning the first coordinate system of the head-wearable device with the second coordinate system of the handheld device based on the pose of the head-wearable device and the pose of the handheld device.

7. The method of claim 5, wherein aligning the first coordinate system of the head-wearable device with the second coordinate system of the handheld device comprises:

generating a first point cloud with the head-wearable device;

generating a second point cloud with the handheld device; and aligning the first coordinate system of the head-wearable device with the second coordinate system of the handheld device based on the first point cloud and the second point cloud.

8. The method of claim 7, further comprising:

executing, by the head-wearable device, an Iterative Closest Point (ICP) algorithm or equivalent point-cloud registration algorithm to register the first point cloud with the second point cloud; and determining a relative pose between the first coordinate system and the second coordinate system based on a registration of the first point cloud with the second point cloud.

9. The method of claim 7, wherein generating the first point cloud comprises: accessing a first set of 3D points based on images captured with the camera of the head-wearable device and corresponding pose data from a first six-degrees of freedom (6DOF) tracker of the head-wearable device, wherein generating the second point cloud comprises:

accessing a second set of 3D points based on images captured with a camera of the handheld device and corresponding pose data from a second six-degrees of freedom (6DOF) tracker of the handheld device.

10. The method of claim 1, wherein the head-wearable device sends AR data and pose data to the handheld device, the AR data indicating the first mixed reality application operating at the head-wearable device, wherein the pose data indicates the pose of the head-wearable device in the shared coordinate system, wherein the handheld device is configured to operate the second mixed reality application corresponding to the first mixed reality application based on the AR data, display the virtual object in the display of the handheld device based on the AR data, the pose data of the head-wearable device, and pose data of the handheld device.

11. A computing apparatus comprising:

a processor; and a memory storing instructions that, when executed by the processor, configure the apparatus to:

pair a head-wearable device with a handheld device to establish a shared coordinate system by:

generating, by the handheld device, a fiducial marker in a display of the handheld device, the fiducial marker encoding a six-degrees-of-freedom (6DOF) pose of the handheld device;

capturing, by a camera of the head-wearable device, an image of the fiducial marker displayed on the handheld device;

decoding, by the head-wearable device, the fiducial marker to recover the encoded 6DOF pose of the handheld device;

computing, by the head-wearable device, a rigid-body transform between the head-wearable device and the handheld device based on a pose of the head-wearable device and the recovered 6DOF pose of the handheld device; and aligning a coordinate system of the head-wearable device with a coordinate system of the handheld device using the computed rigid-body transform to establish the shared coordinate system; and display, based on a pose of the handheld device, a virtual object of a first mixed reality application operating at the head-wearable device, with a second mixed reality application operating at the handheld device using the shared coordinate system.

12. The computing apparatus of claim 11, wherein displaying the virtual object comprises:

rendering the virtual object on the handheld device from a viewpoint that is spatially displaced from, and outside, a current field of view of the head-wearable device, such that the handheld device provides a third-person perspective based on the pose of the head-wearable device in the shared coordinate system and the pose of the handheld device in the shared coordinate system.

13. The computing apparatus of claim 11, wherein the first mixed reality application and the second mixed reality application are both registered with a same user account.

14. The computing apparatus of claim 11, wherein the first mixed reality application is registered with a first user account and the second mixed reality application is registered with a second user account.

15. The computing apparatus of claim 11, wherein pairing comprises:
  aligning a first coordinate system of the head-wearable device with a second coordinate system of the handheld device; and
  establishing the shared coordinate system for both the head-wearable device and the handheld device based on aligning the first coordinate system and the second coordinate system.

16. The computing apparatus of claim 15, wherein aligning the first coordinate system of the head-wearable device with the second coordinate system of the handheld device comprises:
  displaying a fiduciary marker in the display of the handheld device, the fiduciary marker being based on the pose of the handheld device;
  capturing a picture of the fiduciary marker with the camera of the head-wearable device;
  in response to capturing the picture of the fiduciary marker, identifying the pose of the handheld device based on the picture of the fiduciary marker;
  in response to capturing the picture of the fiduciary marker, identifying a pose of the head-wearable device; and
  aligning the first coordinate system of the head-wearable device with the second coordinate system of the handheld device based on the pose of the head-wearable device and the pose of the handheld device.

17. The computing apparatus of claim 15, wherein aligning the first coordinate system of the head-wearable device with the second coordinate system of the handheld device comprises:
  generating a first point cloud with the head-wearable device;
  generating a second point cloud with the handheld device; and
  aligning the first coordinate system of the head-wearable device with the second coordinate system of the handheld device based on the first point cloud and the second point cloud.

18. The computing apparatus of claim 17, wherein the instructions further configure the apparatus to:
  execute, by the head-wearable device, an Iterative Closest Point (ICP) algorithm or equivalent point-cloud registration algorithm to register the first point cloud with the second point cloud; and
  determine a relative pose between the first coordinate system and the second coordinate system based on the registration of the first point cloud with the second point cloud.

19. The computing apparatus of claim 17, wherein generating the first point cloud comprises:
  accessing a first set of 3D points based on images captured with the camera of the head-wearable device and corresponding pose data from a first six-degrees of freedom (6DOF) tracker of the head-wearable device,
  wherein generating the second point cloud comprises:
    access a second set of 3D points based on images captured with a camera of the handheld device and corresponding pose data from a second six-degrees of freedom (6DOF) tracker of the handheld device.

20. A non-transitory computer-readable storage medium, the computer-readable storage medium including instructions that when executed by a computer, cause the computer to:
  pair a head-wearable device with a handheld device to establish a shared coordinate system by:
  generating, by the handheld device, a fiducial marker in a display of the handheld device, the fiducial marker encoding a six-degrees-of-freedom (6DOF) pose of the handheld device;
  capturing, by a camera of the head-wearable device, an image of the fiducial marker displayed on the handheld device;
  decoding, by the head-wearable device, the fiducial marker to recover the encoded 6DOF pose of the handheld device;
  computing, by the head-wearable device, a rigid-body transform between the head-wearable device and the handheld device based on a pose of the head-wearable device and the recovered 6DOF pose of the handheld device; and
  aligning a coordinate system of the head-wearable device with a coordinate system of the handheld device using the computed rigid-body transform to establish the shared coordinate system; and
  displaying, based on a pose of the handheld device, a virtual object of a first mixed reality application operating at the head-wearable device, with a second mixed reality application operating at the handheld device using the shared coordinate system.

* * * * *